United States Patent
Ge et al.

(10) Patent No.: US 12,457,612 B2
(45) Date of Patent: Oct. 28, 2025

(54) RESOURCE CONFIGURATION METHOD AND APPARATUS, AND SYSTEM

(71) Applicant: HUAWEI TECHNOLOGIES CO., LTD., Shenzhen (CN)

(72) Inventors: Shibin Ge, Shanghai (CN); Haicun Hang, Shanghai (CN); Xiaohan Wang, Shanghai (CN); Liuliu Ji, Shanghai (CN); Xiaoyan Bi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 421 days.

(21) Appl. No.: 17/212,182

(22) Filed: Mar. 25, 2021

(65) Prior Publication Data

US 2021/0212040 A1    Jul. 8, 2021

Related U.S. Application Data

(63) Continuation of application No. PCT/CN2019/108076, filed on Sep. 26, 2019.

(30) Foreign Application Priority Data

Sep. 26, 2018 (CN) .......................... 201811123856.2

(51) Int. Cl.
- *H04W 72/23*    (2023.01)
- *H04L 5/00*    (2006.01)
- *H04L 27/26*    (2006.01)

(52) U.S. Cl.
CPC ........... *H04W 72/23* (2023.01); *H04L 5/0051* (2013.01); *H04L 27/261* (2013.01)

(58) Field of Classification Search
CPC .............................. H04L 5/0023; H04W 72/23
See application file for complete search history.

(56) References Cited

U.S. PATENT DOCUMENTS

2015/0049704 A1* 2/2015 Park .................. H04L 5/0051
                                                        370/329
2017/0288743 A1  10/2017 Nam et al.
(Continued)

FOREIGN PATENT DOCUMENTS

CN        102404854 A        4/2012
CN        102957471 A        3/2013
(Continued)

OTHER PUBLICATIONS

Huang He, Research and Realization of Key Technologies in Uplink COMP of LTE-advanced Physical Layer. FiberHome Technologies Group, 2018, 1 page.
(Continued)

*Primary Examiner* — Sulaiman Nooristany
(74) *Attorney, Agent, or Firm* — Rimon PC

(57) ABSTRACT

Embodiments of this application disclose a resource configuration method, apparatus, and system. A network device sends, to a terminal device, resource configuration information of a demodulation reference signal (DMRS) resource that meets a predetermined rule. The terminal device receives the resource configuration information of a DMRS, where the received resource configuration information includes two or more groups of resource configuration information, and the DMRS is used for demodulating a physical data channel. In the two or more groups of resource configuration information, a DMRS resource configured by any group of resource configuration information does not intersect with a physical data channel resource corresponding to another group of resource configuration information.

19 Claims, 18 Drawing Sheets

(56) References Cited

U.S. PATENT DOCUMENTS

| | | | | |
|---|---|---|---|---|
| 2019/0068308 | A1* | 2/2019 | Shin | H04L 5/0023 |
| 2019/0082427 | A1* | 3/2019 | Kim | H04W 72/0446 |
| 2019/0200326 | A1* | 6/2019 | Shin | H04L 5/0051 |
| 2020/0045708 | A1* | 2/2020 | Hwang | H04L 5/0051 |
| 2021/0337548 | A1* | 10/2021 | Gao | H04L 5/0023 |

FOREIGN PATENT DOCUMENTS

| | | |
|---|---|---|
| CN | 103220802 A | 7/2013 |
| CN | 108024382 A | 5/2018 |
| CN | 108111272 A | 6/2018 |
| CN | 108111275 A | 6/2018 |
| EP | 3047587 A1 | 7/2016 |
| EP | 2485560 B1 | 2/2018 |
| EP | 3667978 A1 | 6/2020 |
| JP | 2016076942 A | 5/2016 |
| WO | 2015040579 A1 | 3/2015 |

OTHER PUBLICATIONS

Jean-Baptiste Yamindi et al., The approach of the New Downlink Control Information Design for Transmission Mode. Oct. 2013 Wireless Telecommunications Symposium (WTS), Jul. 25, 2013, 7 pages.

Sharp, DMRS enhancements for UL Comp. 3GPP TSG RAN WG1 Meeting #68, Dresden, Germany, Feb. 6-10, 2012, R1-120828, 11 pages.

ZTE, Sanechips, Remaining details on DL DMRS and UL DMRS, 3GPP TSG RAN WG1 Meeting 90bis, R1-1717433, Prague, CZ, Oct. 9-13, 2017, 8 pages.

CATT, Discussion on remaining details of DMRS, 3GPP TSG RAN WG1 Meeting NR#3, R1-1715807, Nagoya, Japan, Sep. 18-21, 2017, 9 pages.

Huawei, HiSilicon, "Design of DL DMRS for data transmission," 3GPP TSG RAN WG1 Meeting #88bis, Spokane, USA, Apr. 3-7, 2017, R1-1704233; 6 pages.

* cited by examiner

| Duration in symbols | DM-RS positions $\bar{l}$ | | | | | | | |
|---|---|---|---|---|---|---|---|---|
| | PDSCH mapping type A | | | | PDSCH mapping type B | | | |
| | dmrs-AdditionalPosition | | | | dmrs-AdditionalPosition | | | |
| | 0 | 1 | 2 | 3 | 0 | 1 | 2 | 3 |
| 2 | - | - | - | - | $l_0$ | $l_0$ | - | - |
| 3 | $l_0$ | $l_0$ | $l_0$ | $l_0$ | - | - | - | - |
| 4 | $l_0$ | $l_0$ | $l_0$ | $l_0$ | $l_0$ | $l_0$ | - | - |
| 5 | $l_0$ | $l_0$ | $l_0$ | $l_0$ | - | - | - | - |
| 6 | $l_0$ | $l_0$ | $l_0$ | $l_0$ | $l_0$ | $l_0$, 4 | - | - |
| 7 | $l_0$ | $l_0$ | $l_0$ | $l_0$ | $l_0$ | $l_0$, 4 | - | - |
| 8 | $l_0$ | $l_0$, 7 | $l_0$, 7 | $l_0$, 7 | - | - | - | - |
| 9 | $l_0$ | $l_0$, 7 | $l_0$, 7 | $l_0$, 7 | - | - | - | - |
| 10 | $l_0$ | $l_0$, 9 | $l_0$, 6, 9 | $l_0$, 6, 9 | - | - | - | - |
| 11 | $l_0$ | $l_0$, 9 | $l_0$, 6, 9 | $l_0$, 6, 9 | - | - | - | - |
| 12 | $l_0$ | $l_0$, 9 | $l_0$, 6, 9 | $l_0$, 5, 8, 11 | - | - | - | - |
| 13 | $l_0$ | $l_0$, 11 | $l_0$, 7, 11 | $l_0$, 5, 8, 11 | - | - | - | - |
| 14 | $l_0$ | $l_0$, 11 | $l_0$, 7, 11 | $l_0$, 5, 8, 11 | - | - | - | - |

Interval 1 | Interval 2 | Interval 3 | Interval 4

FIG. 6(a)

| Duration in symbols | DM-RS positions $\bar{l}$ | | | | | | | |
|---|---|---|---|---|---|---|---|---|
| | PUSCH mapping type A | | | | PUSCH mapping type B | | | |
| | *dmrs-AdditionalPosition* | | | | *dmrs-AdditionalPosition* | | | |
| | 0 | 1 | 2 | 3 | 0 | 1 | 2 | 3 |
| <4 | - | - | - | - | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0, 4$ | $l_0, 4$ | $l_0, 4$ |
| 6 | $l_0$ | $l_0$ | $l_0$ | $l_0$ | $l_0$ | $l_0, 4$ | $l_0, 4$ | $l_0, 4$ |
| 7 | $l_0$ | $l_0$ | $l_0$ | $l_0$ | $l_0$ | $l_0, 4$ | $l_0, 4$ | $l_0, 4$ |
| 8 | $l_0$ | $l_0, 7$ | $l_0, 7$ | $l_0, 7$ | $l_0$ | $l_0, 6$ | $l_0, 3, 6$ | $l_0, 3, 6$ |
| 9 | $l_0$ | $l_0, 7$ | $l_0, 7$ | $l_0, 7$ | $l_0$ | $l_0, 6$ | $l_0, 3, 6$ | $l_0, 3, 6$ |
| 10 | $l_0$ | $l_0, 9$ | $l_0, 6, 9$ | $l_0, 6, 9$ | $l_0$ | $l_0, 8$ | $l_0, 4, 8$ | $l_0, 3, 6, 9$ |
| 11 | $l_0$ | $l_0, 9$ | $l_0, 6, 9$ | $l_0, 6, 9$ | $l_0$ | $l_0, 8$ | $l_0, 4, 8$ | $l_0, 3, 6, 9$ |
| 12 | $l_0$ | $l_0, 9$ | $l_0, 6, 9$ | $l_0, 5, 8, 11$ | $l_0$ | $l_0, 10$ | $l_0, 5, 10$ | $l_0, 3, 6, 9$ |
| 13 | $l_0$ | $l_0, 11$ | $l_0, 7, 11$ | $l_0, 5, 8, 11$ | $l_0$ | $l_0, 10$ | $l_0, 5, 10$ | $l_0, 3, 6, 9$ |
| 14 | $l_0$ | $l_0, 11$ | $l_0, 7, 11$ | $l_0, 5, 8, 11$ | $l_0$ | $l_0, 10$ | $l_0, 5, 10$ | $l_0, 3, 6, 9$ |

Interval 1 | Interval 2 | Interval 3 | Interval 4

FIG. 7(a)

| Duration in symbols | DM-RS positions $\bar{l}$ | | | | | | | |
|---|---|---|---|---|---|---|---|---|
| | PUSCH mapping type A | | | | PUSCH mapping type B | | | |
| | dmrs-AdditionalPosition | | | | dmrs-AdditionalPosition | | | |
| | 0 | 1 | 2 | 3 | 0 | 1 | 2 | 3 |
| <4 | - | - | | | - | - | | |
| 4 | $l_0$ | $l_0$ | | | $l_0$ | - | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0, 5$ | | |
| 9 | $l_0$ | $l_0$ | | | $l_0$ | $l_0, 5$ | | |
| 10 | $l_0$ | $l_0, 8$ | | | $l_0$ | $l_0, 7$ | | |
| 11 | $l_0$ | $l_0, 8$ | | | $l_0$ | $l_0, 7$ | | |
| 12 | $l_0$ | $l_0, 8$ | | | $l_0$ | $l_0, 9$ | | |
| 13 | $l_0$ | $l_0, 10$ | | | $l_0$ | $l_0, 9$ | | |
| 14 | $l_0$ | $l_0, 10$ | | | $l_0$ | $l_0, 9$ | | |

Interval 1

Interval 2

FIG. 7(b)

| Duration in symbols | DM-RS positions $\bar{l}$ ||||||||
|---|---|---|---|---|---|---|---|---|
| | PDSCH mapping type A |||| PDSCH mapping type B ||||
| | dmrs-AdditionalPosition |||| dmrs-AdditionalPosition ||||
| | 0 | 1 | 2 | 3 | 0 | 1 | 2 | 3 |
| 2 | - | - | - | - | - | - | | |
| 3 | $l_0$ | $l_0$ | $l_0$ | $l_0$ | $l_0$ | $l_0$ | | |
| 4 | $l_0$ | $l_0$ | $l_0$ | $l_0$ | - | - | | |
| 5 | $l_0$ | $l_0$ | $l_0$ | $l_0$ | $l_0$ | $l_0$ | | |
| 6 | $l_0$ | $l_0$ | $l_0$ | $l_0$ | - | - | | |
| 7 | $l_0$ | $l_0$ | $l_0$ | $l_0$ | $l_0$ | $l_0, 4$ | | |
| 8 | $l_0$ | $l_0, 7$ | $l_0, 7$ | $l_0, 7$ | $l_0$ | $l_0, 4$ | | |
| 9 | $l_0$ | $l_0, 7$ | $l_0, 7$ | $l_0, 7$ | - | - | | |
| 10 | $l_0$ | $l_0, 9$ | $l_0, 6, 9$ | $l_0, 6, 9$ | - | - | | |
| 11 | $l_0$ | $l_0, 9$ | $l_0, 6, 9$ | $l_0, 6, 9$ | - | - | | |
| 12 | $l_0$ | $l_0, 9$ | $l_0, 6, 9$ | $l_0, 5, 8, 11$ | - | - | | |
| 13 | $l_0$ | $l_0, 11$ | $l_0, 7, 11$ | $l_0, 5, 8, 11$ | - | - | | |
| 14 | $l_0$ | $l_0, 11$ | $l_0, 7, 11$ | $l_0, 5, 8, 11$ | - | - | | |

Interval 1

FIG. 8(a)

| Duration in symbols | DM-RS positions $\bar{l}$ | | | | | | | |
|---|---|---|---|---|---|---|---|---|
| | PUSCH mapping type A | | | | PUSCH mapping type B | | | |
| | dmrs-AdditionalPosition | | | | dmrs-AdditionalPosition | | | |
| | 0 | 1 | 2 | 3 | 0 | 1 | 2 | 3 |
| <4 | - | - | - | - | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0, 4$ | $l_0, 4$ | $l_0, 4$ |
| 6 | $l_0$ | $l_0$ | $l_0$ | $l_0$ | $l_0$ | $l_0, 4$ | $l_0, 4$ | $l_0, 4$ |
| 7 | $l_0$ | $l_0$ | $l_0$ | $l_0$ | $l_0$ | $l_0, 4$ | $l_0, 4$ | $l_0, 4$ |
| 8 | $l_0$ | $l_0, 7$ | $l_0, 7$ | $l_0, 7$ | $l_0$ | $l_0, 6$ | $l_0, 3, 6$ | $l_0, 3, 6$ |
| 9 | $l_0$ | $l_0, 7$ | $l_0, 7$ | $l_0, 7$ | $l_0$ | $l_0, 6$ | $l_0, 3, 6$ | $l_0, 3, 6$ |
| 10 | $l_0$ | $l_0, 9$ | $l_0, 6, 9$ | $l_0, 6, 9$ | $l_0$ | $l_0, 8$ | $l_0, 4, 8$ | $l_0, 3, 6, 9$ |
| 11 | $l_0$ | $l_0, 9$ | $l_0, 6, 9$ | $l_0, 6, 9$ | $l_0$ | $l_0, 8$ | $l_0, 4, 8$ | $l_0, 3, 6, 9$ |
| 12 | $l_0$ | $l_0, 9$ | $l_0, 6, 9$ | $l_0, 5, 8, 11$ | $l_0$ | $l_0, 10$ | $l_0, 5, 10$ | $l_0, 3, 6, 9$ |
| 13 | $l_0$ | $l_0, 11$ | $l_0, 7, 11$ | $l_0, 5, 8, 11$ | $l_0$ | $l_0, 10$ | $l_0, 5, 10$ | $l_0, 3, 6, 9$ |
| 14 | $l_0$ | $l_0, 11$ | $l_0, 7, 11$ | $l_0, 5, 8, 11$ | $l_0$ | $l_0, 10$ | $l_0, 5, 10$ | $l_0, 3, 6, 9$ |

Interval 1

FIG. 8(b)

| Duration in symbols | DM-RS positions $\bar{l}$ | | | | | | | |
|---|---|---|---|---|---|---|---|---|
| | PUSCH mapping type A | | | | PUSCH mapping type B | | | |
| | *dmrs-AdditionalPosition* | | | | *dmrs-AdditionalPosition* | | | |
| | 0 | 1 | 2 | 3 | 0 | 1 | 2 | 3 |
| <4 | - | - | - | - | - | - | - | - |
| 4 | $l_0$ | $l_0$ | - | - | $l_0$ | $l_0$ | $l_0$ | $l_0$ |
| 5 | $l_0$ | $l_0$ | $l_0$ | $l_0$ | $l_0$ | $l_0$ | $l_0$ | $l_0$ |
| 6 | $l_0$ | $l_0$ | $l_0$ | $l_0$ | $l_0$ | $l_0, 4$ | $l_0, 4$ | $l_0, 4$ |
| 7 | $l_0$ | $l_0$ | $l_0$ | $l_0$ | $l_0$ | $l_0, 4$ | $l_0, 4$ | $l_0, 4$ |
| 8 | $l_0$ | $l_0, 7$ | $l_0, 7$ | $l_0, 7$ | $l_0$ | $l_0, 4$ | $l_0, 4$ | $l_0, 4$ |
| 9 | $l_0$ | $l_0, 7$ | $l_0, 7$ | $l_0, 7$ | $l_0$ | $l_0, 6$ | $l_0, 3, 6$ | $l_0, 3, 6$ |
| 10 | $l_0$ | $l_0, 9$ | $l_0, 6, 9$ | $l_0, 6, 9$ | $l_0$ | $l_0, 6$ | $l_0, 3, 6$ | $l_0, 3, 6$ |
| 11 | $l_0$ | $l_0, 9$ | $l_0, 6, 9$ | $l_0, 6, 9$ | $l_0$ | $l_0, 8$ | $l_0, 4, 8$ | $l_0, 3, 6, 9$ |
| 12 | $l_0$ | $l_0, 9$ | $l_0, 6, 9$ | $l_0, 5, 8, 11$ | $l_0$ | $l_0, 8$ | $l_0, 4, 8$ | $l_0, 3, 6, 9$ |
| 13 | $l_0$ | $l_0, 11$ | $l_0, 7, 11$ | $l_0, 5, 8, 11$ | $l_0$ | $l_0, 10$ | $l_0, 5, 10$ | $l_0, 3, 6, 9$ |
| 14 | $l_0$ | $l_0, 11$ | $l_0, 7, 11$ | $l_0, 5, 8, 11$ | $l_0$ | $l_0, 10$ | $l_0, 5, 10$ | $l_0, 3, 6, 9$ |

Interval 1

FIG. 8(c)

| Duration in symbols | DM-RS positions $\bar{l}$ ||||||||
|---|---|---|---|---|---|---|---|---|
| | PUSCH mapping type A |||| PUSCH mapping type B ||||
| | *dmrs-AdditionalPosition* |||| *dmrs-AdditionalPosition* ||||
| | *0* | *1* | *2* | *3* | *0* | *1* | *2* | *3* |
| <4 | - | - | | | - | - | | |
| 4 | $l_0$ | $l_0$ | | | - | - | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0, 5$ | | |
| 9 | $l_0$ | $l_0$ | | | $l_0$ | $l_0, 5$ | | |
| 10 | $l_0$ | $l_0, 8$ | | | $l_0$ | $l_0, 7$ | | |
| 11 | $l_0$ | $l_0, 8$ | | | $l_0$ | $l_0, 7$ | | |
| 12 | $l_0$ | $l_0, 8$ | | | $l_0$ | $l_0, 9$ | | |
| 13 | $l_0$ | $l_0, 10$ | | | $l_0$ | $l_0, 9$ | | |
| 14 | $l_0$ | $l_0, 10$ | | | $l_0$ | $l_0, 9$ | | |

Interval 1

FIG. 8(d)

| Duration in symbols | DM-RS positions $\bar{l}$ | | | | | | | |
|---|---|---|---|---|---|---|---|---|
| | PDSCH mapping type A | | | | PDSCH mapping type B | | | |
| | dmrs-AdditionalPosition | | | | dmrs-AdditionalPosition | | | |
| | 0 | 1 | 2 | 3 | 0 | 1 | 2 | 3 |
| 2 | - | - | - | - | $l_0$ | $l_0$ | | |
| 3 | $l_0$ | $l_0$ | $l_0$ | $l_0$ | - | - | | |
| 4 | $l_0$ | $l_0$ | $l_0$ | $l_0$ | $l_0$ | $l_0$ | | |
| 5 | $l_0$ | $l_0$ | $l_0$ | $l_0$ | - | - | | |
| 6 | $l_0$ | $l_0$ | $l_0$ | $l_0$ | $l_0$ | $l_0, 4$ | | |
| 7 | $l_0$ | $l_0$ | $l_0$ | $l_0$ | $l_0$ | $l_0, 4$ | | |
| 8 | $l_0$ | $l_0, 7$ | $l_0, 7$ | $l_0, 7$ | - | - | | |
| 9 | $l_0$ | $l_0, 7$ | $l_0, 7$ | $l_0, 7$ | - | - | | |
| 10 | $l_0$ | $l_0, 9$ | $l_0, 6, 9$ | $l_0, 6, 9$ | - | - | | |
| 11 | $l_0$ | $l_0, 9$ | $l_0, 6, 9$ | $l_0, 6, 9$ | - | - | | |
| 12 | $l_0$ | $l_0, 9$ | $l_0, 6, 9$ | $l_0, 5, 8, 11$ | - | - | | |
| 13 | $l_0$ | $l_0, 11$ | $l_0, 7, 11$ | $l_0, 5, 8, 11$ | - | - | | |
| 14 | $l_0$ | $l_0, 11$ | $l_0, 7, 11$ | $l_0, 5, 8, 11$ | - | - | | |

Subinterval 1 | Subinterval 2 | Subinterval 3 | Subinterval 4

FIG. 9(a)

| Duration in symbols | DM-RS positions $\bar{l}$ | | | | | | | |
|---|---|---|---|---|---|---|---|---|
| | PDSCH mapping type A | | | | PDSCH mapping type B | | | |
| | dmrs-AdditionalPosition | | | | dmrs-AdditionalPosition | | | |
| | 0 | 1 | 2 | 3 | 0 | 1 | 2 | 3 |
| 2 | - | - | - | - | $l_0$ | $l_0$ | | |
| 3 | $l_0$ | $l_0$ | $l_0$ | $l_0$ | - | - | | |
| 4 | $l_0$ | $l_0$ | $l_0$ | $l_0$ | $l_0$ | $l_0$ | | |
| 5 | $l_0$ | $l_0$ | $l_0$ | $l_0$ | - | - | | |
| 6 | $l_0$ | $l_0$ | $l_0$ | $l_0$ | $l_0$ | $l_0$, 4 | | |
| 7 | $l_0$ | $l_0$ | $l_0$ | $l_0$ | $l_0$ | $l_0$, 4 | | |
| 8 | $l_0$ | $l_0$, 7 | $l_0$, 7 | $l_0$, 7 | - | - | | |
| 9 | $l_0$ | $l_0$, 7 | $l_0$, 7 | $l_0$, 7 | - | - | | |
| 10 | $l_0$ | $l_0$, 9 | $l_0$, 6, 9 | $l_0$, 6, 9 | - | - | | |
| 11 | $l_0$ | $l_0$, 9 | $l_0$, 6, 9 | $l_0$, 6, 9 | - | - | | |
| 12 | $l_0$ | $l_0$, 9 | $l_0$, 6, 9 | $l_0$, 5, 8, 11 | - | - | | |
| 13 | $l_0$ | $l_0$, 11 | $l_0$, 7, 11 | $l_0$, 5, 8, 11 | - | - | | |
| 14 | $l_0$ | $l_0$, 11 | $l_0$, 7, 11 | $l_0$, 5, 8, 11 | - | - | | |

Subinterval 1
Subinterval 2
Subinterval 3
Subinterval 4

FIG. 9(b)

| Duration in symbols | DM-RS positions $\bar{l}$ | | | | | | | | |
|---|---|---|---|---|---|---|---|---|---|
| | PDSCH mapping type A | | | | PDSCH mapping type B | | | | |
| | dmrs-AdditionalPosition | | | | dmrs-AdditionalPosition | | | | |
| | 0 | 1 | 2 | 3 | 0 | 1 | 2 | 3 | |
| 2 | - | - | - | - | $l_0$ | $l_0$ | | | |
| 3 | $l_0$ | $l_0$ | $l_0$ | $l_0$ | - | - | | | |
| 4 | $l_0$ | $l_0$ | $l_0$ | $l_0$ | $l_0$ | $l_0$ | | | |
| 5 | $l_0$ | $l_0$ | $l_0$ | $l_0$ | - | - | | | |
| 6 | $l_0$ | $l_0$ | $l_0$ | $l_0$ | $l_0$ | $l_0, 4$ | | | |
| 7 | $l_0$ | $l_0$ | $l_0$ | $l_0$ | $l_0$ | $l_0, 4$ | | | |
| 8 | $l_0$ | $l_0, 7$ | $l_0, 7$ | $l_0, 7$ | - | - | | | |
| 9 | $l_0$ | $l_0, 7$ | $l_0, 7$ | $l_0, 7$ | - | - | | | |
| 10 | $l_0$ | $l_0, 9$ | $l_0, 6, 9$ | $l_0, 6, 9$ | - | - | | | |
| 11 | $l_0$ | $l_0, 9$ | $l_0, 6, 9$ | $l_0, 6, 9$ | - | - | | | |
| 12 | $l_0$ | $l_0, 9$ | $l_0, 6, 9$ | $l_0, 5, 8, 11$ | - | - | | | |
| 13 | $l_0$ | $l_0, 11$ | $l_0, 7, 11$ | $l_0, 5, 8, 11$ | - | - | | | |
| 14 | $l_0$ | $l_0, 11$ | $l_0, 7, 11$ | $l_0, 5, 8, 11$ | - | - | | | |

Subinterval 1 | Subinterval 2 | Subinterval 3 | Subinterval 4

FIG. 9(c)

RESOURCE CONFIGURATION METHOD AND APPARATUS, AND SYSTEM

CROSS-REFERENCE TO RELATED APPLICATIONS

This application is a continuation of International Application No. PCT/CN2019/108076, filed on Sep. 26, 2019, and claims priority to Chinese Patent Application No. 201811123856.2, filed on Sep. 26, 2018. The disclosures of the aforementioned applications are hereby incorporated by reference in their entireties.

TECHNICAL FIELD

This application relates to the field of communications technology, and in particular, to a resource configuration method, apparatus, and system in a communications system.

BACKGROUND

With the rapid development of mobile communications, higher requirements are imposed on performance for a cell-edge user. With the rapid development of mobile communications, higher requirements are imposed on a communications system in terms of system capacity, instantaneous peak rate, spectral efficiency, cell-edge user throughput, delay, and the like. A coordinated multipoint transmission/reception (COMP) technology can improve system performance in both uplink direction and downlink direction, and is a method for solving an inter-cell interference problem and improving a cell-edge user throughput, especially for improving cell-edge spectral efficiency.

In the CoMP technology, a plurality of transmission and reception points (multi-TRP) may simultaneously serve one terminal device. During multi-TRP coordination, in a new radio (NR) communications system, a plurality of TRPs may simultaneously send downlink control information (DCI) to a terminal device. The terminal device may find and detect, in a plurality of different search spaces, a plurality of pieces of DCI that indicate physical downlink shared channels (PDSCH). Similarly, in an uplink direction, the same case may also exist in a physical uplink shared channel (PUSCH).

For a physical data channel (for example, a PDSCH or a PUSCH), using a PDSCH as an example, a receive end can receive, based on a related configuration parameter that indicates a demodulation reference signal (DMRS) for demodulating the physical data channel, the DMRS at a corresponding resource position, so as to demodulate the corresponding physical data channel. In a multi-TRP scenario, there may be a plurality of physical data channels. Consequently, a DMRS of a physical data channel may overlap with the data of another physical data channel on a time-frequency resource, resulting in interference and conflict and affecting channel estimation performance. Therefore, how to avoid such conflict is a problem that needs to be resolved.

SUMMARY

This application provides a resource configuration method, apparatus, and system, used to manage a DMRS resource configuration based on a predetermined rule, to effectively control DMRS transmission and data transmission in a plurality of physical data channels, thereby ensuring channel estimation performance.

According to a first aspect, a resource configuration method and apparatus are provided.

In a possible design, the method is applied to a terminal device. A network device sends, to the terminal device, resource configuration information of a DMRS resource that meets a predetermined rule, thereby ensuring channel estimation performance of a receive end. The method includes: receiving resource configuration information of a demodulation reference signal DMRS, where the resource configuration information includes two or more groups, and the DMRS is used for demodulating a physical data channel; determining, based on the resource configuration information, a DMRS resource configured by each group of resource configuration information, where in the two or more groups of resource configuration information, a DMRS resource configured by any group of resource configuration information does not intersect with a physical data channel resource corresponding to another group of resource configuration information; and a physical data channel corresponding to the physical data channel resource is demodulated by using a DMRS transmitted on a DMRS resource configured by another group of resource configuration information.

It can be understood that the resource configuration information includes one or more pieces of parameter information, and the parameter information may be sent by a transmit end in one or more times. Group division of the two or more groups of resource configuration information is logical division of physical data channels, but the resource configuration information does not necessarily need to be divided into groups in actual sending. In other words, the two or more groups of resource configuration information include parameter information shared between the groups, where the shared parameter information may be sent together by using higher layer signaling. Optionally, the two or more groups of resource configuration information may be sent by a plurality of transmit ends or may be sent by one transmit end. This is not limited in this application.

In this design, the DMRS resource that meets the predetermined rule is configured for the terminal device, thereby ensuring the channel estimation performance of the data receive end.

In a possible design, that a DMRS resource configured by any group of resource configuration information does not intersect with a physical data channel resource corresponding to another group of resource configuration information includes at least one of the following manners, that is, can be implemented in at least one of the following manners: The DMRS resource configured by any group of resource configuration information is identical with the DMRS resource configured by another group of resource configuration information in time domain; or the DMRS resource configured by any group of resource configuration information includes a first DMRS resource and/or a second DMRS resource, the first DMRS resource is identical with the DMRS resource configured by another group of resource configuration information in time domain, and the second DMRS resource does not intersect with the physical data channel resource corresponding to another group of resource configuration information in time domain. It can be understood that in the first manner, the DMRS resource configured by any group of resource configuration information is identical with the DMRS resource configured by another group of resource configuration information in time domain. In this case, according to an existing specification requirement, the DMRS resource configured by any group of resource configuration information is no longer configured for data transmission corresponding to another group of resource configuration information. Then, the DMRS resource configured by any group of resource configuration information does not intersect with the physical data channel resource corresponding to another group of resource configuration information. In the second manner, if the DMRS resource configured by any group of resource configuration information includes the first DMRS resource and the second DMRS resource, the first DMRS resource is identical with the DMRS resource configured by another group of resource configuration information in time domain. In this case, according to an existing specification requirement, the DMRS resource configured by any group of resource configuration information is no longer configured for data transmission corresponding to another group of configuration information. The first DMRS resource does not intersect with the physical data channel resource corresponding to another group of resource configuration information. The second DMRS resource does not intersect with the physical data channel resource corresponding to another group of resource configuration information in time domain. This may be as follows: A position of the second DMRS resource is a resource position other than the DMRS resource configured by another group of resource configuration information and other than the physical data channel resource corresponding to another group of resource configuration information. Similarly, if the DMRS resource configured by any group of resource configuration information includes the first DMRS resource or the second DMRS resource, according to the foregoing limitation on the first DMRS resource and the second DMRS resource, the first DMRS resource or the second DMRS resource does not intersect with the physical data channel resource corresponding to another group of resource configuration information. Optionally, DMRS resources configured by the groups of resource configuration information belong to a same interval in time domain, and the interval is one or more intervals. Each interval includes one or more subintervals, and DMRSs belonging to a same subinterval have identical time domain resources.

A DMRS resource configuration is limited by using the predetermined rule. This can avoid conflict between DMRS transmission and PDSCH transmission, thereby ensuring the channel estimation performance of the data receive end.

Correspondingly, the resource configuration apparatus is provided. The apparatus can implement the corresponding method according to the first aspect. For example, the apparatus is limited by a function form, and may be an entity on a receive end side or an entity on a terminal side. A specific implementation form of the apparatus may be a terminal device, for example, may be the terminal device or may be a chip or a function module in the terminal device. The apparatus can implement the foregoing method by using software, hardware, or hardware executing corresponding software.

In a possible design, the apparatus may include a processor. The processor is configured to support the apparatus in performing corresponding functions in the foregoing method according to the first aspect. Further, the apparatus may include a memory, coupled to the processor and configured to store a program (an instruction) and data that are essential to the apparatus. In addition, the apparatus may further include a communications interface, configured to support the apparatus in communicating with other network elements. The communications interface may be a transceiver.

In a possible design, the apparatus may include a transceiver unit and/or a processing unit. The transceiver unit is configured to communicate with the transmit end to receive the resource configuration information. The processing unit is configured to determine a DMRS resource.

According to a second aspect, a resource configuration method and apparatus are provided.

In a possible design, the method is applied to a network device, for example, an access node or a transmission and reception point. The network device sends, to a terminal device, resource configuration information of a DMRS resource that meets a predetermined rule, thereby ensuring channel estimation performance of a data receive end. The method includes: determining one group of resource configuration information corresponding to a demodulation reference signal DMRS, where the one group of resource configuration information includes one or more pieces of resource configuration information, and the DMRS is used for demodulating a physical data channel; and sending the one group of resource configuration information to the terminal device, where the resource configuration information in the one group of resource configuration information is sent together or separately, a DMRS resource configured by the one group of resource configuration information does not intersect with a physical data channel resource corresponding to another group of resource configuration information configured for the terminal device, and a physical data channel corresponding to the physical data channel resource is demodulated by using a DMRS transmitted on a DMRS resource configured by another group of resource configuration information.

It can be understood that the resource configuration information includes one or more pieces of parameter information, and the parameter information may be sent by a transmit end in one or more times. Group division of the one group of resource configuration information and another group of resource configuration information is logical division of physical data channels, but the resource configuration information does not necessarily need to be divided into groups in actual sending. In other words, the one group of resource configuration information includes parameter information shared with another group of resource configuration information, where the shared parameter information may be sent together by using higher layer signaling. Optionally, another group of resource configuration information may be sent by another network device or may be sent by the current network device. This is not limited in this application.

In this design, the DMRS resource that meets the predetermined rule is configured for the terminal device, thereby ensuring the channel estimation performance of the data receive end.

In a possible design, that a DMRS resource configured by the one group of resource configuration information does not intersect with a physical data channel resource corresponding to another group of resource configuration information configured for the terminal device includes at least one of the following manners, that is, can be implemented in at least one of the following manners: The DMRS resource configured by the one group of resource configuration information is identical with the DMRS resource configured by another group of resource configuration information in time domain; or the DMRS resource configured by the one group of resource configuration information includes a first DMRS resource and/or a second DMRS resource, the first DMRS resource is identical with the DMRS resource configured by another group of resource configuration information in time domain, and the second DMRS resource does not intersect with the physical data channel resource corresponding to another group of resource configuration information in time domain. It can be understood that in the first manner, the DMRS resource configured by the one group of resource configuration information is identical with the DMRS resource configured by another group of resource configuration information in time domain. In this case, according to an existing specification requirement, it can be implemented that the DMRS resource configured by any group of resource configuration information is no longer configured for data corresponding to another group of configuration information. Then, the DMRS resource configured by the one group of resource configuration information does not intersect with the physical data channel resource corresponding to another group of resource configuration information. In the second manner, if the DMRS resource configured by the one group of resource configuration information includes the first DMRS resource and the second DMRS resource, the first DMRS resource is identical with the DMRS resource configured by another group of resource configuration information in time domain. In this case, according to an existing specification requirement, the DMRS resource configured by the one group of resource configuration information is no longer configured for data corresponding to another group of configuration information. The first DMRS resource does not intersect with the physical data channel resource corresponding to another group of resource configuration information. The second DMRS resource does not intersect with the physical data channel resource corresponding to another group of resource configuration information in time domain. This may be as follows: A position of the second DMRS resource is a resource position other than the DMRS resource corresponding to another group of resource configuration information and other than the physical data channel resource corresponding to another group of resource configuration information. Similarly, if the DMRS resource configured by the one group of resource configuration information includes the first DMRS resource or the second DMRS resource, according to the foregoing limitation on the first DMRS resource and the second DMRS resource, the first DMRS resource or the second DMRS resource does not intersect with the physical data channel resource corresponding to another group of resource configuration information.

Optionally, the DMRS resource configured by the one group of resource configuration information and the DMRS resource configured by another group of resource configuration information belong to a same interval in time domain, and the interval is one or more intervals. Each interval includes one or more subintervals, and DMRSs belonging to a same subinterval have identical time domain resources.

A DMRS resource configuration is limited by using the predetermined rule. This can avoid conflict between DMRS transmission and PDSCH transmission, thereby ensuring the channel estimation performance of the data receive end.

Correspondingly, the resource configuration apparatus is provided. The apparatus can implement the corresponding method according to the second aspect. For example, the apparatus is limited by a function form, and may be an entity on a network side. A specific implementation form of the apparatus may be a network device, for example, may be the network device or may be a chip or a function module in the network device. The apparatus can implement the foregoing method by using software, hardware, or hardware executing corresponding software.

In a possible design, the apparatus may include a processor. The processor is configured to support the apparatus in performing corresponding functions in the foregoing method according to the second aspect. Further, the apparatus may include a memory, coupled to the processor and configured to store a program (an instruction) and data that are essential to the apparatus. In addition, the apparatus may further include a communications interface, configured to support the apparatus in communicating with other network elements. The communications interface may be a transceiver.

In a possible design, the apparatus may include a transceiver unit and/or a processing unit. The transceiver unit is configured to communicate with the receive end to send the one group of resource configuration information. The processing unit is configured to determine the one group of resource configuration information of the demodulation reference signal DMRS resource.

Based on any technical solution provided in the first aspect or the second aspect:

In a possible design, the physical data channel includes a physical downlink shared channel PDSCH and/or a physical uplink shared channel PUSCH.

In a possible design, resource configuration information includes at least one of the following types of parameter information: a mapping type of a physical data channel, a quantity of time units occupied by the physical data channel, a start symbol of the physical data channel, a maximum quantity of DMRS additional positions, a quantity of time units of a front-loaded DMRS, a position of the front-loaded DMRS, or a DMRS type.

In a possible design, the mapping type of the physical data channel includes at least one of the following: a type A or a type B; or the mapping type of the physical data channel is a type A.

In a possible design, optionally, the resource configuration information is sent by using at least one of the following types of signaling: radio resource control RRC, downlink control information DCI, or media access control element MAC CE.

In a possible design, interval division uses a default setting or is based on at least one of the following: a value of the maximum quantity of DMRS additional positions or a quantity of symbols occupied by the physical data channel.

According to a third aspect, a resource configuration method and apparatus are provided.

In a possible design, the method is applied to a terminal device. The terminal device selects, based on a priority rule, resource configuration information that is of a DMRS resource and that is sent by a network device, thereby ensuring channel estimation performance of a data receive end. The method includes: receiving resource configuration information of a demodulation reference signal DMRS, where the resource configuration information includes two or more groups, and the DMRS is used for demodulating a physical data channel; and selecting, based on the priority rule, a DMRS resource corresponding to one group of resource configuration information, as a resource of the DMRS for demodulating the physical data channel.

In this design, the terminal device selects, based on the priority rule, the resource configuration information that is of the DMRS resource and that is sent by the network device, thereby ensuring the channel estimation performance of the data receive end.

In a possible design, before the selecting, based on the priority rule, a DMRS resource corresponding to one group of resource configuration information, as a resource of the DMRS for demodulating the physical data channel, the method further includes: determining, based on the resource configuration information, that DMRS resources configured by the groups of resource configuration information conflict with each other. In other words, the terminal device needs to perform selection based on the priority rule only when the DMRS resources corresponding to the plurality of groups of resource configuration information conflict with each other. This can optimize a configuration. Optionally, the terminal device performs selection based on the priority rule regardless of whether the DMRS resources corresponding to the plurality of groups of resource configuration information conflict with each other, thereby reducing processing complexity.

Correspondingly, the resource configuration apparatus is provided. The apparatus can implement the corresponding method according to the third aspect. For example, the apparatus is limited by a function form, and may be an entity on a receive end side or an entity on a terminal side. A specific implementation form of the apparatus may be a terminal device, for example, may be the terminal device or may be a chip or a function module in the terminal device. The apparatus can implement the foregoing method by using software, hardware, or hardware executing corresponding software.

In a possible design, the apparatus may include a processor. The processor is configured to support the apparatus in performing corresponding functions in the foregoing method according to the fourth aspect. Further, the apparatus may include a memory, coupled to the processor and configured to store a program (an instruction) and data that are essential to the apparatus. In addition, the apparatus may further include a communications interface, configured to support the apparatus in communicating with other network elements. The communications interface may be a transceiver.

In a possible design, the apparatus may include a transceiver unit and/or a processing unit. The transceiver unit is configured to communicate with a transmit end to receive the resource configuration information. The processing unit is configured to select the DMRS resource.

According to a fourth aspect, a resource configuration method and apparatus are provided.

In a possible design, the method is applied to a network device, for example, an access node or a transmission and reception point. Distinction is made at a transmit end based on a priority rule, thereby ensuring channel estimation performance of a receive end. The method includes: determining one group of resource configuration information corresponding to a demodulation reference signal DMRS, where the one group of resource configuration information includes one or more pieces of resource configuration information, and the DMRS is used for demodulating a physical data channel; and sending the one group of resource configuration information to a terminal device, where the resource configuration information in the one group of resource configuration information is sent together or separately, and a DMRS resource configured by the one group of resource configuration information and a DMRS resource configured by another group of resource configuration information configured for the terminal device have different selection priorities. It can be understood that the terminal device can select, based on a selection priority, a DMRS resource configured by a piece of resource configuration information, as a resource of the DMRS for demodulating the physical data channel.

In this design, the DMRS resources corresponding to the resource configuration information are distinguished between based on the selection priorities, thereby ensuring the channel estimation performance of the data receive end.

Correspondingly, the resource configuration apparatus is provided. The apparatus can implement the corresponding method according to the fourth aspect. For example, the apparatus is limited by a function form, and may be an entity on a transmit end side or an entity on a network side. A specific implementation form of the apparatus may be a network device, for example, may be the network device or may be a chip or a function module in the network device. The apparatus can implement the foregoing method by using software, hardware, or hardware executing corresponding software.

In a possible design, the apparatus may include a processor. The processor is configured to support the apparatus in performing corresponding functions in the foregoing method according to the fourth aspect. Further, the apparatus may include a memory, coupled to the processor and configured to store a program (an instruction) and data that are essential to the apparatus. In addition, the apparatus may further include a communications interface, configured to support the apparatus in communicating with other network elements. The communications interface may be a transceiver.

In a possible design, the apparatus may include a transceiver unit and/or a processing unit. The transceiver unit is configured to communicate with the receive end to send the one group of resource configuration information. The processing unit is configured to determine the one group of resource configuration information of the demodulation reference signal DMRS resource.

Based on any technical solution provided in the third aspect or the fourth aspect:

In a possible design, the physical data channel includes a physical downlink shared channel PDSCH and/or a physical uplink shared channel PUSCH.

In a possible design, resource configuration information includes at least one of the following types of parameter information: a mapping type of a physical data channel, a quantity of time units occupied by the physical data channel, a start symbol of the physical data channel, a maximum quantity of DMRS additional positions, a quantity of time units of a front-loaded DMRS, a position of the front-loaded DMRS, or a DMRS type.

In a possible design, the mapping type of the physical data channel includes at least one of the following: a type A or a type B; or the mapping type of the physical data channel is a type A.

In a possible design, optionally, the resource configuration information is sent by using at least one of the following types of signaling: radio resource control RRC, downlink control information DCI, or media access control element MAC CE.

In a possible design, the priority rule is divided based on an ID of at least one of the following parameters that correspond to signaling that carries the resource configuration information: a control resource set (CORESET), a control resource set group (CORESET group), a physical downlink control channel configuration PDCCH-config/a physical uplink control channel configuration PUCCH-config, a search space search space, a search space group, a DMRS port group DMRS port group, a cell identifier cell ID, a cell group identifier cell group ID, a transmission and reception point identifier TRP ID, or a transport block (TB) ID.

In a possible design, the priorities are divided based on whether signaling for configuring the resource configuration information is primary or secondary signaling.

In a possible design, the priorities are divided based on levels (for example, a first level and a second level) of signaling for configuring the resource configuration information.

In a possible design, the priorities are divided based on whether signaling for configuring the resource configuration information is fast or slow signaling.

In a possible design, the priorities are divided based on whether signaling for configuring the resource configuration information is common signaling or specific-type signaling.

In a possible design, the priorities are divided based on whether a cell/cell group corresponding to the resource configuration information is a primary or secondary cell/cell group.

It can be understood that in the technical solutions mentioned in the third or fourth aspect, the DMRS resources configured by the plurality of groups of resource configuration information may also meet the predetermined rule (to be specific, the DMRS resource configured by any group of resource configuration information does not intersect with the physical data channel resource corresponding to another group of resource configuration information) in the first aspect or the second aspect.

This application further provides a computer-readable storage medium that stores a computer program (instruction). When the program (instruction) is run on a computer, the computer is enabled to perform the method according to any one of the foregoing aspects.

This application further provides a computer program product. When the computer program product is run on a computer, the computer is enabled to perform the method according to any one of the foregoing aspects.

This application further provides a chip that stores an instruction. When the instruction is run on a communications device, the communications device is enabled to perform the corresponding method according to any of the foregoing aspects.

This application further provides an apparatus, including a memory, a processor, and a computer program that is stored in the memory and that can be run on the processor. When executing the computer program, the processor performs the corresponding method according to each of the foregoing aspects.

This application further provides an apparatus, including a processor. The processor is coupled to a memory, and is configured to read an instruction in the memory and perform, according to the instruction, the corresponding method according to each of the foregoing aspects. It can be understood that the memory may be integrated into the processor or may be independent of the processor.

This application further provides an apparatus, including a processor. When executing a computer program, the processor performs the corresponding method according to each of the foregoing aspects. The processor may be a dedicated processor.

This application further provides a system, including the apparatus on the terminal side and the apparatus on the network side that are provided above. These system constituents perform the corresponding method according to each of the foregoing aspects.

It can be understood that any of the apparatus, computer-readable storage medium, computer program product, chip, and system that are provided above is configured to perform the corresponding method provided above. Therefore, for beneficial effects thereof that can be achieved, reference may be made to the beneficial effects in the corresponding method. Details are not described herein again.

BRIEF DESCRIPTION OF DRAWINGS

To describe the technical solutions in the embodiments of this application more clearly, the following briefly describes the accompanying drawings for illustrating the embodiments of this application. Apparently, the accompanying drawings in the following description merely show certain embodiments of this application, and a person of ordinary skill in the art may derive other drawings from the embodiments of this application and these accompanying drawings without creative efforts.

FIG. 6(a) is a schematic diagram of configuration parameter interval division of a PDSCH with a single-symbol DMRS according to this application;

FIG. 7(a) is a schematic diagram of configuration parameter interval division of a PUSCH with a single-symbol DMRS according to this application;

FIG. 7(b) is a schematic diagram of configuration parameter interval division of a PUSCH with a dual-symbol DMRS according to this application;

FIG. 8(a) is a schematic diagram of another type of configuration parameter interval division of a PDSCH with a single-symbol DMRS according to this application;

FIG. 8(b) is a schematic diagram of another type of configuration parameter interval division of a PDSCH with a dual-symbol DMRS according to this application;

FIG. 8(c) is a schematic diagram of another type of configuration parameter interval division of a PUSCH with a single-symbol DMRS according to this application;

FIG. 8(d) is a schematic diagram of another type of configuration parameter interval division of a PUSCH with a dual-symbol DMRS according to this application;

FIG. 9(a) to FIG. 9(c) are schematic diagrams of several types of configuration parameter interval division of a PDSCH with a single-symbol DMRS according to this application;

DESCRIPTION OF EMBODIMENTS

Figure 1:
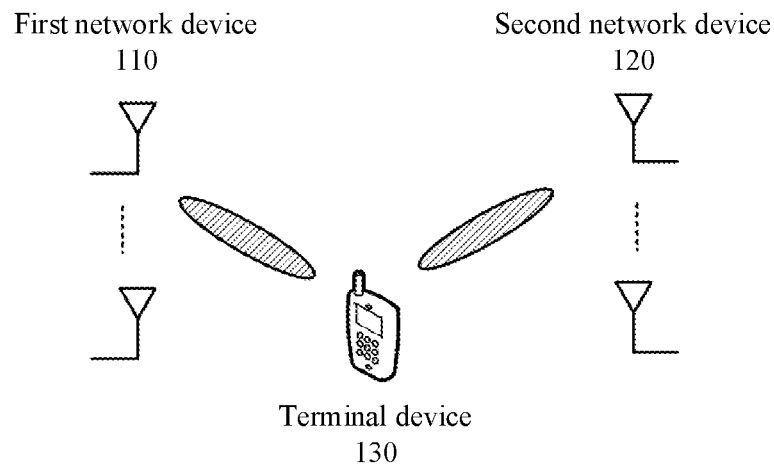
FIG. 1 is a schematic block diagram of a wireless communications system according to this application.

To explain the technical problems, technical solutions, and technical effects of this application in more details, the following further describes the technical solutions of this application in the form of embodiments with reference to the accompanying drawings. The detailed descriptions provide various embodiments of a device and/or a process by using block diagrams, flowcharts, and/or examples. These block diagrams, flowcharts, and/or examples include one or more functions and/or operations, so a person skilled in the art may understand that each function and/or operation in the block diagrams, the flowcharts, and/or the examples may be performed independently and/or jointly by using much hardware, software, and firmware, and/or any combination thereof.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B each may be in a singular or plural form. The character "/" generally indicates an "or" relationship between the associated objects. "At least one (item) of the following" or a similar expression thereof means any combination of these items, including a single item or any combination of a plurality of items. For example, at least one (item) of a, b, or c may represent a, b, c, a and b, a and c, b and c, or a and b and c, where a, b, and c each may be in a singular or plural form. Terms such as "first", "second", "third", and "fourth" in this application are merely intended for distinction but do not limit the embodiments of this application.

In this application, terms such as "network" and "system" are usually used interchangeably. However, a person skilled in the art can understand meanings of the terms. A "terminal"/"terminal device" mentioned in this application may be a mobile device in some cases, for example, a mobile phone, a personal digital assistant, a handheld or laptop computer, or a similar device with a telecommunications capability, or may be a wearable device, a vehicle-mounted device, or the like in some cases; and includes a terminal in a future 5G network, a terminal in a future evolved PLMN network, or the like. Such a terminal may include a device and a removable storage module (for example, but not limited to, a universal integrated circuit card (UICC for short) applied to a subscriber identity module (SIM for short), applied to a universal subscriber identity module (USIM for short), or applied to a removable user identity module (R-UIM for short)) associated with the device. Optionally, such a terminal may include a device without such a module. In other cases, the term "terminal"/"terminal device" may include an unportable device that has a similar capability, for example, a desktop computer, a set top box, or a network device. The term "terminal"/"terminal device" may also include any hardware or software component that can be connected a communication session of a user. In addition, "user terminal", "User Equipment", "UE", "site", "station", "STA", "user device", "user agent", "User Agent", "UA", "user equipment", "mobile device", "device", and the like are alternative terms having a same meaning as "terminal"/"terminal device" in this specification. For case of description, the devices mentioned above are collectively referred to as a terminal device or UE in this application.

A network device mentioned in this application is an apparatus that is deployed in a radio access network and that is configured to provide a wireless communication function for a terminal device. The network device can be responsible for functions such as scheduling and configuring a downlink reference signal for UE. The network device may include various forms of macro base stations, micro base stations, relay stations, access points, and the like. The network device may be a base transceiver station (BTS) in a global system for mobile communications (GSM) or code division multiple access (CDMA), or may be a NodeB (NB) in wideband code division multiple access (WCDMA); may be an evolved NodeB (eNB or eNodeB) in long term evolution (LTE), a relay station or an access point, a transmission point or a transmission and reception point (TRP or TP) or a next generation Node B (gNB) in a new radio (NR) system, a wireless fidelity (Wi-Fi) site, a wireless backhaul node, a small cell, a micro cell, or a base station device in a future 5th generation mobile communications (5G) network; or may be a radio controller in a cloud radio access network (CRAN) scenario. Alternatively, the network device may be a relay station, an access point, a vehicle-mounted device, a wearable device, a network device in a 5G network or a network device in a future evolved PLMN network, or the like, for example, a transmission point (TRP or TP) in an NR system, a gNB (gNB) in the NR system, or one antenna panel or a group of antenna panels (including a plurality of antenna panels) of a gNB in a 5G system. This is not particularly limited in the embodiments of this application. A name of the network device may vary in systems using different radio access technologies. For case of description, in this application, all the foregoing apparatuses that provide a wireless communication function for the UE are referred to as a network device.

FIG. 1 is a schematic block diagram of a wireless communications system 100 according to an embodiment of this application. The wireless communications system 100 may include a first network device 110, a second network device 120, and one or more terminal devices 130 located in coverage areas of the first network device 110 and the second network device 120. The terminal device 130 may be a mobile or fixed device. The first network device 110 and the second network device 120 each communicate with the terminal device 130 through a radio air interface. The first network device 110 and the second network device 120 may provide communication coverage for a specific geographical region and can communicate with a terminal device in the coverage area.

The wireless communications system 100 can support multi-TRP transmission. To be specific, at least two network devices (transmission points) transmit downlink data to a terminal device in a coordinated multipoint transmission/reception manner. In other words, the terminal device 130 can communicate with both the first network device 110 and the second network device 120 on a same carrier. The coordinated multipoint transmission/reception manner is implemented by using a space diversity technology, a spatial multiplexing technology, and/or other technologies. This is not limited in this application.

"Coordinated multipoint transmission/reception" in this application includes, but is not limited to, joint transmission (JT). JT includes coherent JT and non-coherent JT (NCJT). A difference between coherent JT and non-coherent JT lies in that, in NCJT, beamforming is separately performed for different MIMO data streams from a plurality of coordinated TPs; and in JT, joint beamforming is performed for MIMO data streams from a plurality of coordinated TPs.

In this embodiment of this application, the first network device 110 may serve as a serving network device, and the second network device 120 may serve as a coordinated network device. Alternatively, the first network device 110 may serve as a coordinated network device, and the second network device 120 may serve as a serving network device.

In a scenario in which coordinated multipoint transmission/reception is applied, the serving network device may send control signaling to a terminal device, and the coordinated network device may send data to the terminal device; or the serving network device may send control signaling to a terminal device, and both the serving network device and the coordinated network device may send data to a terminal device; or both the serving network device and the coordinated network device may send control signaling to the terminal device, and both the serving network device and the coordinated network device may send data to the terminal device. This is not particularly limited in this embodiment of this application. The serving network device and the coordinated network device may communicate with each other, and a plurality of coordinated network devices may communicate with each other, for example, to transfer a control message.

For example, the first network device 110 is a serving network device, and the second network device 120 is a coordinated network device. There may be one or more second network devices 120. Alternatively, both the first network device and the second network device may be serving network devices. This is not limited in this embodiment of this application.

In NR, the first network device 110 and the second network device 120 each may send, to UE, downlink control information (DCI) (for example, DCI1 and DCI2) for scheduling a physical downlink shared channel (PDSCH). The DCI1 is used to schedule a PDSCH1 to the UE, and DCI2 is used to schedule a PDCH2 to the UE. To ensure channel estimation performance of the UE, in this application, a DMRS corresponding to the PDSCH1 and a symbol position occupied by the PDSCH1 cannot conflict with a DMRS corresponding to the PDSCH2 and a symbol position occupied by the PDSCH2. In other words, the DMRS corresponding to the PDSCH1 does not occupy a same resource as the PDSCH2, and the DMRS corresponding to the PDSCH2 does not occupy a same resource as the PDSCH1. This avoids conflict so that the channel estimation performance of the UE is not affected. It should be understood that in this application, a resource mentioned is a time-frequency resource in two dimensions: time domain and frequency domain. The resource may be a symbol, a slot, or the like in time domain, and may be a subcarrier spacing or the like in frequency domain.

It should be understood that in the embodiments of this application, UE or a network device includes a hardware layer, an operating system layer that runs on the hardware layer, and an application layer that runs on the operating system layer. The hardware layer includes hardware such as a central processing unit (CPU), a memory management unit (MMU), and a memory (also referred to as a main memory). An operating system may be any one or more computer operating systems that implement service processing by using a process, for example, a Linux operating system, a Unix operating system, an Android operating system, an iOS operating system, or a Windows operating system. The application layer includes applications such as a browser, an address book, text processing software, and instant messaging software. In addition, a specific structure of an entity for executing a method provided in the embodiments of this application is not particularly limited in the embodiments of this application, provided that the entity can run a program that records code of the method provided in the embodiments of this application to perform communication according to the method provided in the embodiments of this application. For example, the entity for performing the method provided in the embodiments of this application may be a terminal device or a network device or may be a function module that is in the terminal device or the network device and that can invoke and execute the program.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a compact disc (CD) or a digital versatile disc (DVD))), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

FIG. 1 shows only an example of a network system architecture in this application. This application is not limited thereto. It should be understood that a joint transmission scenario, shown in FIG. 1, to which the embodiments of this application are applicable may be a joint transmission scenario of a homogeneous network or may be a joint transmission scenario of a heterogeneous network. This is not limited in the embodiments of this application.

It should also be understood that the scenario shown in FIG. 1 may be a low frequency scenario or may be a high frequency scenario. This is not limited in the embodiments of this application.

Optionally, this application is not limited to the PDSCH scheduling scenario, and is also applicable to a physical uplink shared channel (PDSCH) scheduling scenario.

Optionally, this application is not limited to the scenario with a plurality of network devices shown in FIG. 1. This application is also applicable to a scenario with a single network device. The technologies that ensure that DMRS resources corresponding to a plurality of physical data channels scheduled to UE do not conflict with another physical data channel fall within the scope of this application.

For case of understanding and description, the following describes, by way of example rather than limitation, a process and an action of performing the method in this application in a communications system.

Embodiment 1

Figure 2:
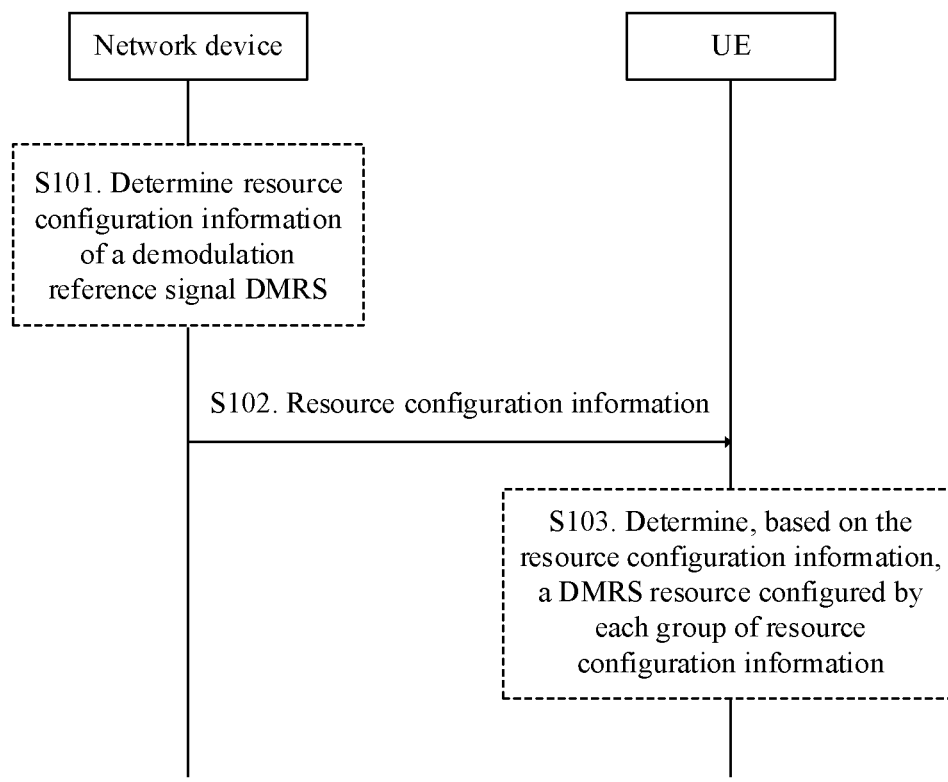
FIG. 2 is a flowchart of Embodiment 1 of a resource configuration method according to this application.

To ensure channel estimation performance of a data receive end, a network device configures, for UE, a DMRS resource that meets a predetermined rule. It should be noted that this embodiment and following embodiments are all described based on interaction between the UE and the network device. The descriptions are merely examples. This application is not limited thereto. In this application, there may be one or more network devices. This application may be applied to a single-TPR scenario and/or a multi-TRP scenario. According to the embodiments of this application, FIG. 2 is a flowchart of Embodiment 1 of a resource configuration method according to this application. For ease of understanding of the solutions, in this embodiment and the following embodiments, actions of a plurality of sides, that is, UE and a network device, are described holistically from a perspective of multi-party interaction. However, this certainly does not mean that an improvement to a system lies in that the steps performed by the sides in the interaction need to be performed in combination. The technical solutions proposed in this application are improved for all the sides of the system.

The method includes the following steps:

S101. The network device determines resource configuration information of a demodulation reference signal DMRS, where the DMRS is used for demodulating a physical data channel.

Optionally, the resource configuration information includes one or more pieces of resource configuration information, and one piece of resource configuration information may also include one or more configuration parameters. A resource of a DMRS may be determined based on a plurality of pieces of resource configuration information.

S102. The network device sends the resource configuration information to the UE, and the UE receives the resource configuration information of the DMRS, where the resource configuration information received by the UE includes two or more groups.

It can be understood that there may be one or more network devices. Regardless of whether one or more network devices are involved, from a perspective of the UE, the resource configuration information received by the UE in this application includes two or more groups. However, the two or more groups do not limit a transmission form of any transmit end.

S103. The UE determines, based on the resource configuration information, a DMRS resource configured by each group of resource configuration information, where in the two or more groups of resource configuration information, a DMRS resource configured by any group of resource configuration information does not intersect with a physical data channel resource corresponding to another group of resource configuration information; and a physical data channel corresponding to the physical data channel resource is demodulated by using a DMRS transmitted on a DMRS resource configured by another group of resource configuration information.

Optionally, the physical data channel includes a physical downlink shared channel PDSCH and/or a physical uplink shared channel PUSCH.

In this embodiment of this application, there may be a plurality of network devices. Each network device sends resource configuration information to the UE. A DMRS resource may be determined jointly based on a plurality of pieces of resource configuration information. Resource configuration information that is of a DMRS, that is corresponding to a same physical data channel, and that is sent by a same network device belongs to a same group. In other words, group division is logical division of physical data channels, but actual to-be-sent content does not necessarily need to be divided into groups and sent in groups. Therefore, the plurality of pieces of resource configuration information may be sent separately or together by the network device. Alternatively, there may be one network device. The network device sends resource configuration information for different DMRS resources to the UE. A DMRS resource may be determined jointly based on a plurality of pieces of resource configuration information. Resource configuration information that is of a DMRS and that is corresponding to a same physical data channel belongs to a same group. The plurality of pieces of resource configuration information may be sent separately or together by the network device. It can be understood that in the foregoing scenarios in which there is one or more network devices, the plurality of pieces of resource configuration information may be sent separately or together by the network device by using higher layer signaling, for example, at least one of the following types of signaling: radio resource control (RRC), downlink control information (DCI), or media access control control element (MAC CE). The two or more groups of resource configuration information optionally include parameter information shared between the groups, where the shared parameter information may be sent together by using higher layer signaling. Optionally, resource configuration information includes at least one of the following types of parameter information: a mapping type of a physical data channel, a quantity of time units occupied by the physical data channel, a start symbol of the physical data channel, a maximum quantity of DMRS additional positions, a quantity of time units of a front-loaded DMRS, a position of the front-loaded DMRS, or a DMRS type (for example, a type1 or a type2).

Figure 3:
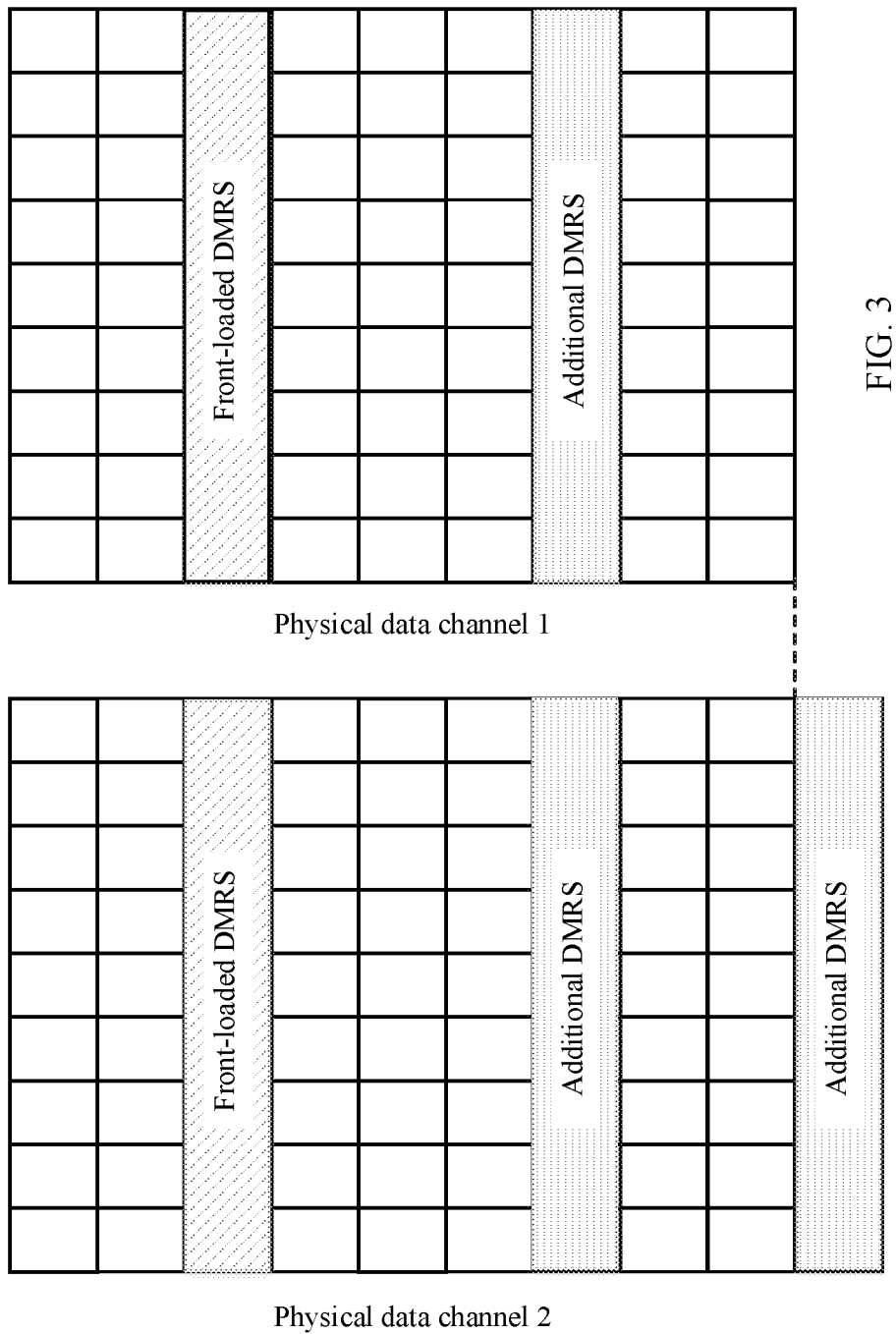
FIG. 3 is a schematic diagram of DMRS configurations corresponding to different physical data channels according to this application.

In this embodiment of this application, FIG. 3 shows a configuration in which in two or more groups of resource configuration information, a DMRS resource configured by any group of resource configuration information does not intersect with a physical data channel resource corresponding to another group of resource configuration information. FIG. 3 is a schematic diagram of DMRS configurations corresponding to different physical data channels according to this application. It can be learned from FIG. 3 that a resource position of a DMRS of a physical data channel 1 is the same as a resource position of a physical data channel 2, or a resource position of a DMRS of the PDSCH2 appears at a position other than a data channel resource of the PDSCH1. In this way, the DMRS resource configured by any group of resource configuration information does not intersect with the physical data channel resource corresponding to another group of resource configuration information. It can be learned that the following optional implementations are available:

The DMRS resource configured by any group of resource configuration information is identical with the DMRS resource configured by another group of resource configuration information in time domain. In other words, DMRS resources corresponding to different physical data channels are identical in time domain and appear at a same time unit position, where the time unit may be a symbol, a slot, a frame, or the like.

The DMRS resource configured by any group of resource configuration information includes a first DMRS resource and/or a second DMRS resource. The first DMRS resource is identical with the DMRS resource configured by another group of resource configuration information in time domain. The second DMRS resource does not intersect with the physical data channel resource corresponding to another group of resource configuration information in time domain. In other words, DMRS resources corresponding to any physical data channel may be identical, in time domain, with some of DMRS resources corresponding to another physical data channel; or some of the DMRS resources corresponding to any physical data channel is identical, in time domain, with the DMRS resources corresponding to another physical data channel. A time domain position of other DMRS resources of the DMRS resources corresponding to any physical data channel appears at a time domain resource position other than a time domain resource occupied by another physical data channel.

It can be understood that in the first manner, the DMRS resource configured by any group of resource configuration information is identical with the DMRS resource configured by another group of resource configuration information in time domain. In this case, according to an existing specification requirement, it can be implemented that a resource that has been configured for a DMRS is no longer configured for data transmission. Then, the DMRS resource configured by any group of resource configuration information does not intersect with the physical data channel resource corresponding to another group of resource configuration information. In the second manner, if the DMRS resource configured by any group of resource configuration information includes the first DMRS resource and the second DMRS resource, the first DMRS resource is identical with the DMRS resource configured by another group of resource configuration information in time domain. In this case, according to an existing specification requirement, it can be implemented that a resource that has been configured for a DMRS is no longer configured for data transmission. The first DMRS resource does not intersect with the physical data channel resource corresponding to another group of resource configuration information. The second DMRS resource does not intersect with the physical data channel resource corresponding to another group of resource configuration information in time domain. This may be as follows: A position of the second DMRS resource is a resource position other than the DMRS resource configured by another group of resource configuration information and other than the physical data channel resource corresponding to another group of resource configuration information. Similarly, if the DMRS resource configured by any group of resource configuration information includes the first DMRS resource or the second DMRS resource, according to the foregoing limitation on the first DMRS resource and the second DMRS resource, the first DMRS resource or the second DMRS resource does not intersect with the physical data channel resource corresponding to another group of resource configuration information.

Optionally, in a scenario in which PDSCH receiving is indicated by multi-downlink control information (DCI), that is, in a multi-DCI scenario, conflict may exist. Therefore, when the technical solutions in this embodiment and the following embodiments are used, a configured DMRS resource needs to meet the predetermined rule. In a non-multi-DCI scenario, configuration may be performed based on or not based on the predetermined rule provided in this application. For example, according to the present application, an extra "DMRS positions" table may be introduced on a basis of NR R15. In the multi-DCI scenario, a table that meets the present application is used. In the non-multi-DCI scenario, an existing table of NR R15 is used.

In the resource configuration method according to this embodiment of this application, a DMRS resource that meets the predetermined rule is configured for the UE, thereby ensuring the channel estimation performance of the data receive end.

Embodiment 2

Figure 4:
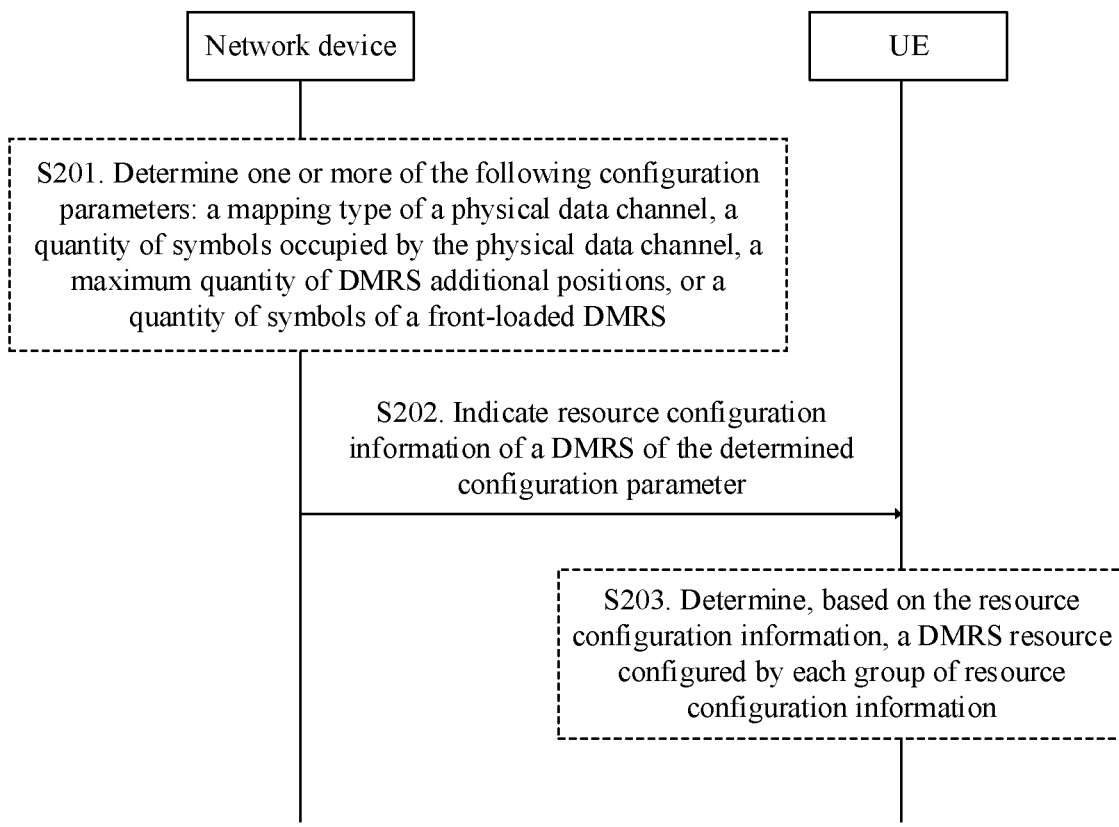
FIG. 4 is a flowchart of Embodiment 2 of a resource configuration method according to this application.

FIG. 4 is a flowchart of Embodiment 2 of a resource configuration method according to this application. A difference from Embodiment 1 lies in that, in this embodiment, resource configuration information of a DMRS is based on a configuration parameter setting that meets a rule. In this way, a DMRS resource that meets the predetermined rule described in Embodiment 1 can be configured. Content same as or similar to that in Embodiment 1 is not described again in this embodiment. It should be noted that for case of understanding of the solutions, this embodiment still provides descriptions holistically from a perspective of multi-party interaction. However, this certainly does not mean that an improvement to a system lies in that steps performed by the sides in the interaction need to be performed in combination. The technical solutions proposed in this application are improved for the sides of the system.

The method includes the following steps:

S201. A network device determines one or more of the following configuration parameters: a mapping type of a physical data channel, a quantity of time units occupied by the physical data channel, a start symbol of the physical data channel, a maximum quantity of DMRS additional positions, a quantity of time units of a front-loaded DMRS, a position of the front-loaded DMRS, or a DMRS type.

Optionally, in this application, there may be one or more network device. When there are a plurality of network devices, the network devices may determine the configuration parameter through negotiation or unified network scheduling. In addition, the network device may determine the configuration parameter in one or more times.

S202. The network device sends, to UE, resource configuration information of a DMRS of the determined configuration parameter; and the UE receives the resource configuration information of the DMRS, where the resource configuration information received by the UE includes two or more groups.

Optionally, the resource configuration information sent by the network device to the UE includes one or more pieces of resource configuration information, and one piece of resource configuration information may also include one or more configuration parameters. When there are a plurality of pieces of resource configuration information, the resource configuration information may be sent separately or together.

S203. The UE determines, based on the resource configuration information, a DMRS resource configured by each group of resource configuration information, where in the two or more groups of resource configuration information, a DMRS resource configured by any group of resource configuration information does not intersect with a physical data channel resource corresponding to another group of resource configuration information; and a physical data channel corresponding to the physical data channel resource is demodulated by using a DMRS transmitted on a DMRS resource configured by another group of resource configuration information.

In this application, a DMRS of a physical data channel includes a front-loaded DMRS and an additional DMRS. A position of the front-loaded DMRS is related to a mapping type of the physical data channel. Two mapping types are supported in NR: a type A and a type B. In the type A, a position of a front-loaded DMRS is relatively fixed. The front-loaded DMRS is located at a fixed symbol position, for example, located at a symbol 2 or a symbol 3 (where symbols are numbered starting from 0). Optionally, whether the front-loaded DMRS is located at the symbol 2 or the symbol 3 is configured by using RRC signaling. However, in the type B, a front-loaded DMRS is related to a resource position of the physical data channel, and the front-loaded DMRS is located at the first symbol of the entire physical data channel.

A quantity of additional DMRSs is determined by a "dmrs-AdditionalPosition" parameter. A position of an additional DMRS is further related to a quantity of symbols occupied by the physical data channel, that is, related to a "duration in symbols" parameter. A resource position of the additional DMRS is further related to the position of the front-loaded DMRS. It can be learned that the additional DMRS needs to involve more parameters than the front-loaded DMRS in resource configuration.

In an implementation, the network device may determine a configuration parameter based on an illustrative relationship between configuration parameters that is set based on a rule and that is shown in Table 1. As shown in FIG. 1, a PDSCH with a single-symbol DMRS is used as an example. A resource position of the DMRS may be determined based on one or more of the following parameters (only some parameters are listed as examples for description in Table 1): a mapping type (mapping type A/B) of a physical data channel, a quantity of time units occupied by the physical data channel (where a time unit may be a symbol or the like, and the symbol is used as an example, that is, a quantity of occupied symbols (Duration in symbols)), a maximum quantity of DMRS additional positions (dmrs-Additional Position), a quantity of time units of a front-loaded DMRS (where a time unit may be a symbol or the like), a position of the front-loaded DMRS, and a DMRS type (for example, a type1 or a type2, which may be used to determine a DMRS distribution pattern). Two network devices are used as an example. A network device 1 needs to configure a DMRS1 corresponding to a physical data channel 1, and a network device 2 needs to configure a DMRS2 corresponding to a physical data channel 2. The network device 1 and the network device 2 need to determine whether the mapping type is the mapping type A or the mapping type B. The mapping type A and the mapping type B have different definitions of a start symbol position "$l_0$". For example, in the type B, the start symbol position is an actual start position of the PDSCH. To be specific, the first symbol position of the PDSCH is used as a position $l_0$ of a front-loaded DMRS. If the actual first symbol position of the PDSCH is the $5^{th}$ symbol, $l_0$ is at the $5^{th}$ symbol. Then, in Table 1, in the type B, if duration in symbols is 6, and a dmrs-Additional Position is 1, a value "$l_0$,4" can be determined accordingly. In this case, an additional DMRS appears at a position "4", and $l_0$ is at the $5^{th}$ symbol. Then, the position "4" is at the 9th symbol. In the mapping type A, a position "$l_0$" of the front-loaded DMRS is relatively fixed, and is configured by a network side or uses a default setting. The front-loaded DMRS is located at a fixed symbol position.

For example, the network device 1 and the network device 2 determine, through negotiation, to configure the mapping type A. The network device 1 and the network device 2 further needs to negotiate on at least a dmrs-Additional Position. If the network device 1 and the network device 2 determine that the dmrs-Additional Position is 2, the network device 1 determines that duration in symbols is 8, and the network device 2 determines that duration in symbols is 9, both an additional DMRS1 and an additional DMRS2 appear at a symbol position "6". In this way, the DMRS resource configured by any group of resource configuration information does not intersect with the physical data channel resource corresponding to another group of resource configuration information. In other words, the DMRS resource configured by any group of resource configuration information is identical with the DMRS resource configured by another group of resource configuration information in time domain.

Alternatively, the network device 1 determines that duration in symbols is 9, and the network device 1 determines that duration in symbols is 11. Then, an additional DMRS1 appears at a symbol position "6" and an additional DMRS2 appears at symbol positions of "6" and "9". At the symbol position "6", resource positions of the additional DMRS1 and the additional DMRS2 are the same. The additional DMRS2 appears at the symbol position "9". Because the network device 1 determines that the duration in symbols is 9, starting from "0", a physical data channel 1 configured for the network device 1 occupies nine symbols from "0" to "8". Then, the physical data channel 1 does not appear at the symbol position "9". In this way, the DMRS resource configured by any group of resource configuration information does not intersect with the physical data channel resource corresponding to another group of resource configuration information. To be specific, the DMRS resource configured by any group of resource configuration information includes a first DMRS resource and/or a second DMRS resource. The first DMRS resource is identical with the DMRS resource configured by another group of resource configuration information in time domain. The second DMRS resource does not intersect with the physical data channel resource corresponding to another group of resource configuration information in time domain.

It should be noted that in the following table, if only a position of "$l_0$" exists, a corresponding configuration has only a front-loaded DMRS but has no additional DMRS. In other words, the PDSCH occupies a small quantity of symbols, and channel estimation performance can be met when only the additional DMRS is used for demodulation.

TABLE 1

| | DM-RS positions $\bar{l}$ | | | | | | | |
|---|---|---|---|---|---|---|---|---|
| | PDSCH mapping type A dmrs-AdditionalPosition | | | | PDSCH mapping type B dmrs-AdditionalPosition | | | |
| Duration in symbols | 0 | 1 | 2 | 3 | 0 | 1 | 2 | 3 |
| 2 | — | — | — | — | $l_0$ | $l_0$ | | |
| 3 | $l_0$ | $l_0$ | $l_0$ | $l_0$ | — | — | | |
| 4 | $l_0$ | $l_0$ | $l_0$ | $l_0$ | $l_0$ | $l_0$ | | |
| 5 | $l_0$ | $l_0$ | $l_0$ | $l_0$ | — | — | | |
| 6 | $l_0$ | $l_0$ | $l_0$ | $l_0$ | $l_0$ | $l_0$, 4 | | |
| 7 | $l_0$ | $l_0$ | $l_0$ | $l_0$ | $l_0$ | $l_0$, 4 | | |
| 8 | $l_0$ | $l_0$, 7 | $l_0$, 6 | $l_0$, 6 | — | — | | |
| 9 | $l_0$ | $l_0$, 7 | $l_0$, 6 | $l_0$, 6 | — | — | | |
| 10 | $l_0$ | $l_0$, 7 | $l_0$, 6, 9 | $l_0$, 6, 9 | — | — | | |
| 11 | $l_0$ | $l_0$, 7 | $l_0$, 6, 9 | $l_0$, 6, 9 | — | — | | |
| 12 | $l_0$ | $l_0$, 7 | $l_0$, 6, 9 | $l_0$, 6, 9, 11 | — | — | | |
| 13 | $l_0$ | $l_0$, 7 | $l_0$, 6, 9 | $l_0$, 6, 9, 11 | — | — | | |
| 14 | $l_0$ | $l_0$, 7 | $l_0$, 6, 9 | $l_0$, 6, 9, 11 | — | — | | |

It can be learned that, by using the relationship between configuration parameters that is set based on the specific rule and that is shown in Table 1, when network devices are configured with same mapping type and dmrs-AdditionalPosition parameters, the DMRS resource configured by any group of resource configuration information does not intersect with the physical data channel resource corresponding to another group of resource configuration information, regardless of a configuration of duration in symbols. Besides the relationship between configuration parameters that is shown in Table 1, similarly, a relationship between configuration parameters that is shown in Table 2 may also be used for a PDSCH with a dual-symbol DMRS. Configuration descriptions are similar to those of Table 1. Details are not described herein again.

TABLE 2

| Duration in symbols | PDSCH mapping type A dmrs-AdditionalPosition | | | PDSCH mapping type B dmrs-AdditionalPosition | | |
|---|---|---|---|---|---|---|
| | 0 | 1 | 2 | 0 | 1 | 2 |
| <4 | $l_0$ | $l_0$ | — | — | | |
| 4 | $l_0$ | $l_0$ | — | — | | |
| 5 | $l_0$ | $l_0$ | — | — | | |
| 6 | $l_0$ | $l_0$ | $l_0$ | $l_0$ | | |
| 7 | $l_0$ | $l_0$ | $l_0$ | $l_0$ | | |
| 8 | $l_0$ | $l_0$ | — | — | | |
| 9 | $l_0$ | $l_0$ | — | — | | |
| 10 | $l_0$ | $l_0, 8$ | — | — | | |
| 11 | $l_0$ | $l_0, 8$ | — | — | | |
| 12 | $l_0$ | $l_0, 8$ | — | — | | |
| 13 | $l_0$ | $l_0, 8$ | — | — | | |
| 14 | $l_0$ | $l_0, 8$ | — | — | | |

In this embodiment, a physical data channel includes a PDSCH and PUSCH. Table 1 and Table 2 above show illustrative relationships between configuration parameters of a PDSCH. Table 3 and Table 4 below respectively show illustrative relationships between configuration parameters of a PUSCH with a single-symbol DMRS and a PUSCH with a dual-symbol DMRS. A configuration rule is similar to that in Table 1 and is not described herein again.

TABLE 3

| Duration in symbols | PUSCH mapping type A dmrs-AdditionalPosition | | | | PUSCH mapping type B dmrs-AdditionalPosition | | | |
|---|---|---|---|---|---|---|---|---|
| | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0, 4$ | $l_0, 4$ | $l_0, 3$ |
| 6 | $l_0$ | $l_0$ | $l_0$ | $l_0$ | $l_0$ | $l_0, 4$ | $l_0, 4$ | $l_0, 3$ |
| 7 | $l_0$ | $l_0$ | $l_0$ | $l_0$ | $l_0$ | $l_0, 4$ | $l_0, 4$ | $l_0, 3$ |
| 8 | $l_0$ | $l_0, 7$ | $l_0, 6$ | $l_0, 6$ | $l_0$ | $l_0, 4$ | $l_0, 4, 6$ | $l_0, 3, 6$ |
| 9 | $l_0$ | $l_0, 7$ | $l_0, 6$ | $l_0, 6$ | $l_0$ | $l_0, 4$ | $l_0, 4, 6$ | $l_0, 3, 6$ |
| 10 | $l_0$ | $l_0, 7$ | $l_0, 6, 9$ | $l_0, 6, 9$ | $l_0$ | $l_0, 4$ | $l_0, 4, 6$ | $l_0, 3, 6, 9$ |
| 11 | $l_0$ | $l_0, 7$ | $l_0, 6, 9$ | $l_0, 6, 9$ | $l_0$ | $l_0, 4$ | $l_0, 4, 6$ | $l_0, 3, 6, 9$ |
| 12 | $l_0$ | $l_0, 7$ | $l_0, 6, 9$ | $l_0, 6, 9, 11$ | $l_0$ | $l_0, 4$ | $l_0, 4, 6$ | $l_0, 3, 6, 9$ |
| 13 | $l_0$ | $l_0, 7$ | $l_0, 6, 9$ | $l_0, 6, 9, 11$ | $l_0$ | $l_0, 4$ | $l_0, 4, 6$ | $l_0, 3, 6, 9$ |
| 14 | $l_0$ | $l_0, 7$ | $l_0, 6, 9$ | $l_0, 6, 9, 11$ | $l_0$ | $l_0, 4$ | $l_0, 4, 6$ | $l_0, 3, 6, 9$ |

TABLE 4

| Duration in symbols | PUSCH mapping type A dmrs-AdditionalPosition | | | | PUSCH mapping type B dmrs-AdditionalPosition | | | |
|---|---|---|---|---|---|---|---|---|
| | 0 | 1 | 2 | 3 | 0 | 1 | 2 | 3 |
| <4 | — | — | | | — | — | | |
| 4 | $l_0$ | $l_0$ | | | — | — | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0, 5$ | | |
| 8 | $l_0$ | $l_0$ | | | $l_0$ | $l_0, 5$ | | |
| 9 | $l_0$ | $l_0$ | | | $l_0$ | $l_0, 5$ | | |
| 10 | $l_0$ | $l_0, 8$ | | | $l_0$ | $l_0, 5$ | | |
| 11 | $l_0$ | $l_0, 8$ | | | $l_0$ | $l_0, 5$ | | |
| 12 | $l_0$ | $l_0, 8$ | | | $l_0$ | $l_0, 5$ | | |
| 13 | $l_0$ | $l_0, 8$ | | | $l_0$ | $l_0, 5$ | | |
| 14 | $l_0$ | $l_0, 8$ | | | $l_0$ | $l_0, 5$ | | |

It should be noted that the foregoing values in Table 1 to Table 4 are intended for illustrative purposes but do not limit actual values during implementation of the solutions of this application.

In the resource configuration method according to this embodiment of this application, based on a configuration parameter setting that meets the specific rule, the network device configures, for the UE by considering a specific relationship between configuration parameters during configuration parameter selection and configuration, a DMRS resource that meet the predetermined rule, thereby ensuring channel estimation performance of a data receive end.

Embodiment 3

Figure 5:
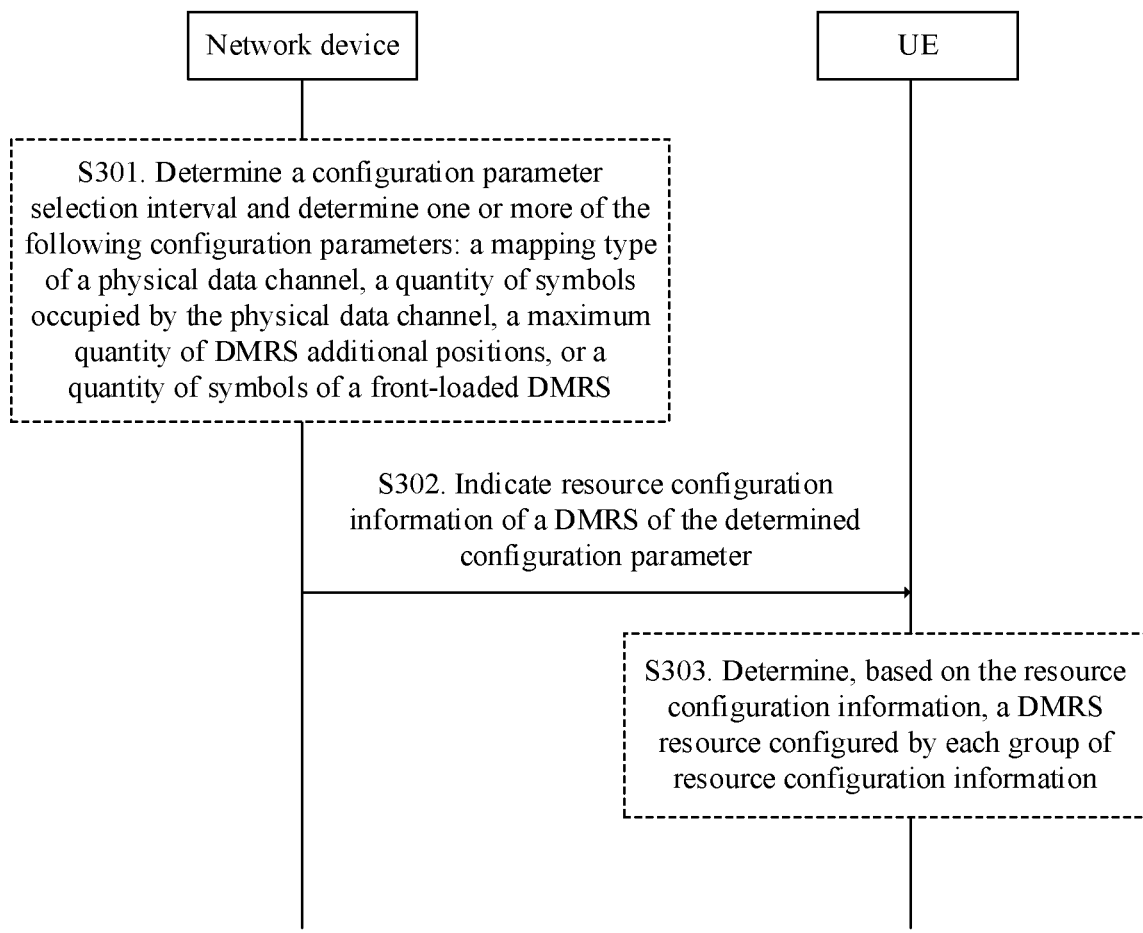
FIG. 5 is a flowchart of Embodiment 3 of a resource configuration method according to this application.

FIG. 5 is a flowchart of Embodiment 3 of a resource configuration method according to this application. A difference from Embodiment 1 and Embodiment 2 lies that this embodiment focuses on configuration parameter determining based on a configuration parameter division rule. Content same as or similar to that in Embodiment 1 and Embodiment 2 is not described again in this embodiment.

The method includes the following steps:

S301. A network device determines a configuration parameter selection interval and determines one or more of the following configuration parameters in the selection interval: a mapping type of a physical data channel, a quantity of time units occupied by the physical data channel, a start symbol of the physical data channel, a maximum quantity of DMRS additional positions, a quantity of time units of a front-loaded DMRS, a position of the front-loaded DMRS, or a DMRS type.

Optionally, in this application, there may be one or more network devices. When there are a plurality of network devices, the network devices may determine the selection interval and/or the configuration parameter through negotiation or unified network scheduling. In addition, the network device may determine the configuration parameter in one or more times.

S302. The network device sends, to UE, resource configuration information of a DMRS of the determined configuration parameter; and the UE receives the resource configuration information of the DMRS, where the resource configuration information received by the UE includes two or more groups.

Optionally, the resource configuration information sent by the network device to the UE includes one or more pieces of resource configuration information, and one piece of resource configuration information may also include one or more configuration parameters. When there are a plurality of pieces of resource configuration information, the resource configuration information may be sent separately or together.

S303. The UE determines, based on the resource configuration information, a DMRS resource configured by each group of resource configuration information, where in the two or more groups of resource configuration information, a DMRS resource configured by any group of resource configuration information does not intersect with a physical data channel resource corresponding to another group of resource configuration information; and a physical data channel corresponding to the physical data channel resource is demodulated by using a DMRS transmitted on a DMRS resource configured by another group of resource configuration information.

FIG. 6(a) is a schematic diagram of configuration parameter interval division of a PDSCH with a single-symbol DMRS according to this application. As shown in FIG. 6(a), interval division is performed based on duration in symbols and/or a dmrs-AdditionalPosition. As shown in FIG. 6(a), an interval 1, an interval 2, an interval 3, and an interval 4 are included. For example, there are a plurality of network devices. The UE may not expect that PDSCHs corresponding to the plurality of network devices be located in different intervals. In other words, the configured PDSCHs corresponding to the plurality of network devices are located in a same interval. For example, "Duration in symbols" of a PDSCH1 is equal to 9 (which belongs to the interval 1), and "Duration in symbols" of a PDSCH2 is equal to 10 (which belongs to the interval 2). Correspondingly, when performing negotiation or performing configuration based on a default setting, the network devices may first perform selection in the plurality of intervals to determine a selection interval. The configured configuration parameter is determined from the selection interval. If there is only one interval, the interval is the selection interval, and the configured configuration parameter is determined from the selection interval. It can be learned that the interval division rule enables a position of a DMRS resource corresponding to each configuration parameter in a same interval to meet the following: When the network devices are configured with same mapping type and dmrs-AdditionalPosition parameters, the DMRS resource configured by any group of resource configuration information does not intersect with the physical data channel resource corresponding to another group of resource configuration information, regardless of a configuration of duration in symbols.

Figure 6B:
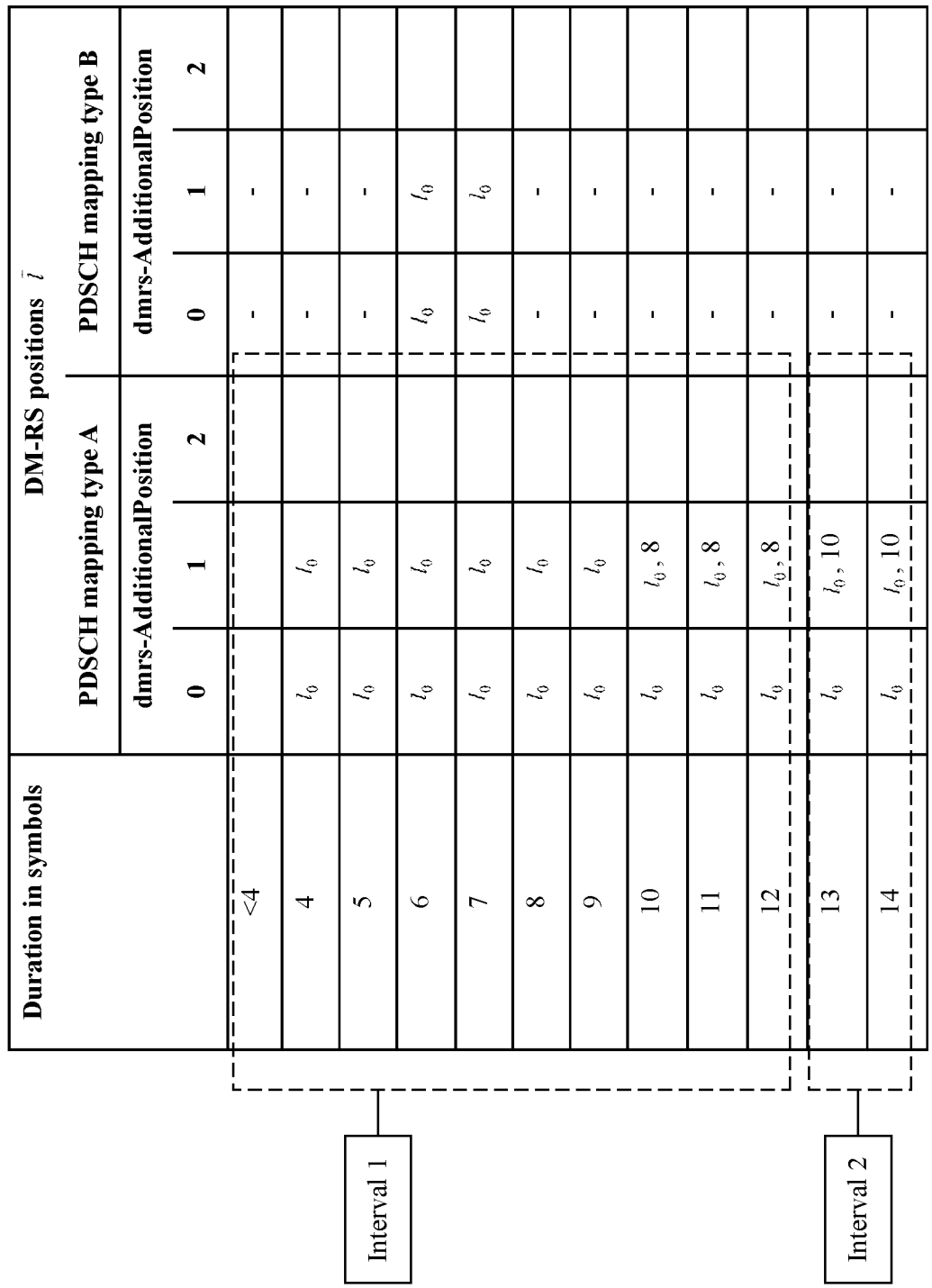
FIG. 6(b) is a schematic diagram of configuration parameter interval division of a PDSCH with a dual-symbol DMRS according to this application.

Besides the configuration parameter interval division, shown in FIG. 6(a), of the PDSCH with a single-symbol DMRS, similarly, a configuration parameter interval division manner shown in FIG. 6(b) may be used for a PDSCH with a dual-symbol DMRS. Configuration descriptions are similar to those of FIG. 6(a). Details are not described herein again. Similarly, FIG. 7(a) and FIG. 7(b) are respectively schematic diagrams of configuration parameter interval division of a PUSCH with a single-symbol DMRS and a PUSCH with a dual-symbol DMRS. A configuration rule is similar to that in FIG. 6(a) and is not described herein again.

In this embodiment of this application, two interval division manners are available: (1) A fixed interval division method in FIG. 6(a) to FIG. 7(b): To be specific, an interval is fixed during preconfiguration and cannot be changed. (2) A variable interval division method: This interval division method is dependent on a value of "dmrs-AdditionalPosition" in signaling. Optionally, a division principle is that "a union set of DMRS locations in any two pieces of PDSCH duration in a same interval is an element in the interval". Optionally, details are as follows:

When "Dmrs-AdditionalPosition 0", there is only one interval that includes the values of duration in symbols. FIG. 8(a), FIG. 8(b), FIG. 8(c), FIG. 8(d), FIG. 8(a), FIG. 8(b), FIG. 8(c), and FIG. 8(d) respectively show a PDSCH with a single-symbol DMRS, a PDSCH with a dual-symbol DMRS, a PUSCH with a single-symbol DMRS, and a PUSCH with a dual-symbol DMRS.

When "Dmrs-AdditionalPosition=1", using a configuration in a mapping type A as an example, subintervals 1, 2, 3, and 4 are obtained through division. As shown in FIG. 9(a), in this case, the network device determines the selection interval from a plurality of intervals. The plurality of intervals may be divided in the following several manners:
  interval 1=[subinterval 1, subinterval 2]; interval 2=[subinterval 3]; and interval 3=[subinterval 4].
  interval 1=[subinterval 1]; interval 2=[subinterval 2]; interval 3=[subinterval 3]; and interval 4=[subinterval 4].
  interval 1=[subinterval 1, subinterval 2]; interval 2=[subinterval 1, subinterval 3]; and interval 3=[subinterval 1, subinterval 4].
  interval 1=[subinterval 1, subinterval 2]; interval 2=[subinterval 1, subinterval 3]; and interval 3=[subinterval 1, subinterval 2, subinterval 4].

When "Dmrs-AdditionalPosition=2", using a configuration in a mapping type A as an example, subintervals 1, 2, 3, and 4 are obtained through division. As shown in FIG. 9(b), in this case, the network device determines the selection interval from a plurality of intervals. The plurality of intervals may be divided in the following several manners:
  interval 1=[subinterval 1, subinterval 2]; interval 2=[subinterval 3]; and interval 3=[subinterval 4].
  interval 1=[subinterval 1]; interval 2=[subinterval 2]; interval 3=[subinterval 3]; and interval 4=[subinterval 4].
  interval 1=[subinterval 1, subinterval 2]; interval 2=[subinterval 1, subinterval 3]; and interval 3=[subinterval 1, subinterval 4].

When "Dmrs-AdditionalPosition=3", using a configuration in a mapping type A as an example, subintervals 1, 2, 3, and 4 are obtained through division. As shown in FIG. 9(c), in this case, the network device determines the selection interval from a plurality of intervals. The plurality of intervals may be divided in the following several manners:
  interval 1=[subinterval 1, subinterval 2]; interval 2=[subinterval 3]; and interval 3=[subinterval 4].
  interval 1=[subinterval 1]; interval 2=[subinterval 2]; interval 3=[subinterval 3]; and interval 4 [subinterval 4].
  interval 1 [subinterval 1, subinterval 2]; interval 2 [subinterval 1, subinterval 3]; and interval 3 [subinterval 1, subinterval 4].

FIG. 9(a) to FIG. 9(c) are schematic diagrams of DMRS configuration parameter division of the PDSCH with a single-symbol DMRS. Similarly, the foregoing variable division method may also be used for a DMRS configuration parameter division of the PDSCH with a dual-symbol DMRS, the PUSCH with a single-symbol DMRS, and the PUSCH with a dual-symbol DMRS. Details are not described herein again.

It should be noted that the values and division ranges of configuration parameters in this embodiment are intended for illustrative purposes and do not limit actual values and division ranges during implementation of the solutions of this application.

In the resource configuration method according to this embodiment of this application, based on configuration parameter division, the network device configures, for the UE by considering a specific relationship between configuration parameters during configuration parameter selection and configuration, a DMRS resource that meet a predetermined rule, thereby ensuring channel estimation performance of a data receive end.

In Embodiment 1, Embodiment 2, and Embodiment 3:
  (1) In another implementation, because a symbol position of 10 in the mapping type B is uncertain, to avoid conflict between a DMRS and a data channel, the mapping type B may not be configured for the UE. Then, during configuration, the network device configures the mapping type to the type A. In other words, in a multi-DCI coordination scenario, the UE does not expect a PDSCH to be of the mapping type B.

(2) In still another implementation, because there may be a plurality of additional DMRS positions and different configuration parameters also vary relatively greatly, to avoid conflict between a DMRS and a data channel, an additional DMRS resource may not be configured for the UE, but a front-loaded DRMS resource is configured instead. In other words, in a multi-DCI coordination scenario, the UE does not expect to be configured with an additional DMRS, or the UE does not expect a dmrs-AdditionalPosition to be greater than 0.

(3) In still another implementation, "time domain resource assignment" (Time domain resource assignment) fields in two pieces of DCI configured for the UE have a same value; "time domain resource assignment" fields in two pieces of DCI configured for the UE indicate a same start and length indicator (SLIV) or resource mapping type; "time domain resource assignment" fields configured for the UE indicate a same SLIV or resource mapping type; or SLIVs indicated by "time domain resource assignment" fields configured for the UE indicate a same interval. In other words, in a multi-DCI coordination scenario, the UE does not expect the "time domain resource assignment" fields configured in the DCI to be different, the SLIVs or resource mapping types indicated by the "time domain resource assignment" fields to be different, the SLIVs and resource mapping types indicated by the "time domain resource assignment" fields to be different, or the intervals indicated by the SLIVs indicated by the "time domain resource assignment" fields to be different. For example, on a premise that the UE does not expect to be configured with the mapping type B (in other words, the UE is configured with the mapping type A), the UE does not expect groups of configuration parameters to be configured with different PDSCH duration or with PDSCH duration belonging to different intervals (in other words, the groups of configuration parameters configured for the UE are configured with same PDSCH duration or with PDSCH duration belonging to a same interval). For another example, on a premise that the mapping type B is configured for the UE in the groups of configuration parameters, the UE does not expect the groups of configuration parameters to be configured with different PDSCH duration, with PDSCH duration belonging to different intervals, or with different start symbols of PDSCH (in other words, the groups of configuration parameters configured for the UE are configured with same PDSCH duration, with PDSCH duration belonging to a same interval, or with a same start symbol of PDSCH).

(4) In still another possible implementation, the UE does not expect groups of DMRSs to have different configurations (in other words, the groups of DMRSs configured for the UE have a same configuration). The configuration includes at least one of: a quantity of front-loaded DMRSs, a quantity of additional DMRSs, a position of a front-loaded DMRS, a position of an additional DMRS, or a DMRS type (type 1 or type 2).

(5) In still another possible implementation, the UE does not expect the DMRS resource configured by any group of resource configuration information to intersect with the physical data channel resource corresponding to another group of resource configuration information (in other words, the DMRS resource configured for the UE in any group of resource configuration information does not intersect with the physical data channel resource corresponding to another group of resource configuration information in time domain).

(6) In still another possible implementation, if the DMRS resource of any group of resource configuration information intersects with the physical data channel resource corresponding to another group of resource configuration information, the UE considers, by default (or according to a protocol stipulation), that the physical data channel corresponding to another group of resource configuration information does not send data on the intersection or does not process data on the intersection.

It should be noted that, for example, there may be two manners for configuring the multi-DCI coordination scenario: (1) A maximum quantity of pieces of DCI is configured by using explicit signaling. When the maximum quantity of pieces of DCI is greater than 1, the multi-DCI coordination scenario is entered. (2) Implicit signaling is used. A quantity of PDCCH-configs is configured to implicitly indicate a maximum quantity of pieces of DCI. When the quantity of PDCCH-configs is greater than 1, the multi-DCI coordination scenario is entered.

It can be understood that the foregoing three implementations may be limited to a framework of Embodiment 1, Embodiment 2, and Embodiment 3, or may not be limited by specific content in Embodiment 1, Embodiment 2, and Embodiment 3.

Embodiment 4

Figure 10:
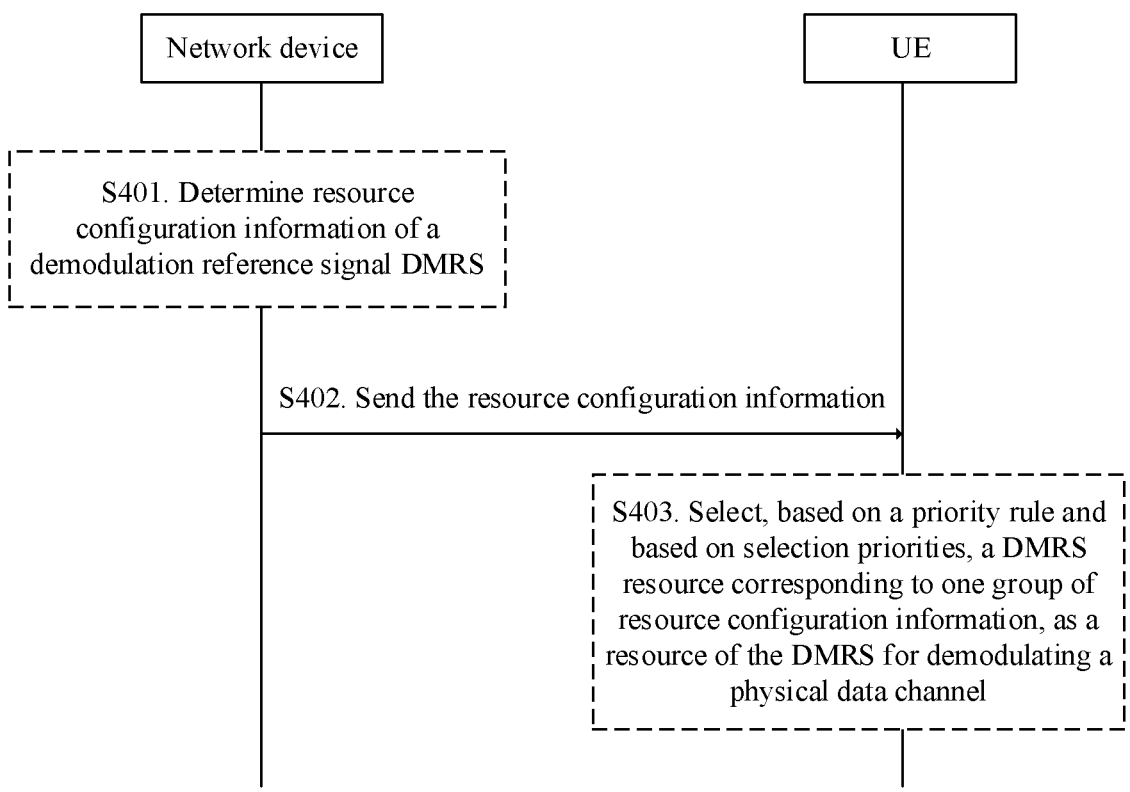
FIG. 10 is a flowchart of Embodiment 4 of a resource configuration method according to this application.

FIG. 10 is a flowchart of Embodiment 4 of a resource configuration method according to this application. A difference from Embodiment 1, Embodiment 2, and Embodiment 3 lies in that in this embodiment, a network device does not necessarily need to consider whether a configured resource meets a rule during configuration, but selects a resource configuration based on a priority, to avoid resource conflict. Content same as or similar to that in Embodiment 1 and Embodiment 2 is not described again in this embodiment. For case of understanding of the solutions, in this embodiment and the following embodiments, actions of a plurality of sides, that is, UE and a network device, are described holistically from a perspective of multi-party interaction. However, this certainly does not mean that an improvement to a system lies in that the steps performed by the sides in the interaction need to be performed in combination. The technical solutions proposed in this application are improved for the sides of the system. It can be understood that in this embodiment, DMRS resources corresponding to a plurality of pieces of resource configuration information may or may not satisfy the predetermined rule (to be specific, the DMRS resource configured by any group of resource configuration information does not intersect with the physical data channel resource corresponding to another group of resource configuration information) in Embodiment 1, Embodiment 2, and Embodiment 3.

The method includes the following steps:

S401. The network device determines resource configuration information of a demodulation reference signal DMRS, where the DMRS is used for demodulating a physical data channel.

Optionally, the resource configuration information includes one or more pieces of resource configuration information, and one piece of resource configuration information may also include one or more configuration parameters. A resource of a DMRS may be determined based on a plurality of pieces of resource configuration information.

S402. The network device sends the resource configuration information to a receive end, and UE receives the resource configuration information of the DMRS, where the resource configuration information received by the UE includes two or more groups.

A DMRS resource configured by any group of resource configuration information and a DMRS resource corresponding to other resource configuration information have different selection priorities. It can be understood that there may be one or more network devices. Regardless of whether one or more network devices are involved, from a perspective of the UE, the resource configuration information received by the UE in this application includes two or more groups. However, the two or more groups do not limit a transmission form of any transmit end.

S403. The UE selects, based on a priority rule and based on the selection priorities, a DMRS resource corresponding to one group of resource configuration information, as a resource of the DMRS for demodulating the physical data channel.

Optionally, the physical data channel includes a physical downlink shared channel PDSCH and/or a physical uplink shared channel PUSCH.

Optionally, resource configuration information includes at least one type of the following parameter information: a mapping type of a physical data channel, a quantity of time units occupied by the physical data channel, a start symbol of the physical data channel, a maximum quantity of DMRS additional positions, a quantity of time units of a front-loaded DMRS, a position of the front-loaded DMRS, or a DMRS type.

Optionally, the mapping type of the physical data channel includes at least one of the following: a type A or a type B; or the mapping type of the physical data channel is a type A.

Optionally, the resource configuration information is sent by using at least one of the following types of signaling: radio resource control RRC, downlink control information DCI, or media access control element MAC CE.

Optionally, before step S403, the UE determines, based on the resource configuration information, that DMRS resources configured by the groups of resource configuration information conflict with each other. In other words, the UE needs to perform selection based on the priority rule only when the DMRS resources corresponding to the plurality of groups of resource configuration information conflict with each other. This can optimize a configuration. Optionally, the UE performs selection based on the priority rule regardless of whether the DMRS resources corresponding to the plurality of groups of resource configuration information conflict with each other, thereby reducing processing complexity.

Specifically, the priorities are described by using an example in which the UE receives two pieces of DCI or configuration parameters related to two pieces of DCI (for example, indication information that is in signaling such as RRC or MAC CE signaling and that is associated with the DCI). DCI is determined based on a priority selection rule and based on different priorities of DCI, and then a DMRS configuration is determined based on an indication of the determine DCI or information related to the DCI. For details about a "time domain resource assignment" field, an SLIV, or a resource mapping type indicated in which DCI or in a related configuration parameter of which DCI is used, refer to the following several examples:

(1) When the UE receives two pieces of DCI or configuration parameters related to two pieces of DCI, the "time domain resource assignment" field follows an indication of DCI with a smaller identifier or an indication of a configuration parameter related to the DCI. That an indication of DCI with a smaller identifier or an indication of a configuration parameter related to the DCI is followed may be embodied as follows: Based on an identifier of a specific configuration parameter in the DCI, a "time domain resource assignment" field correspondingly indicated in DCI in which the identifier of the specific configuration parameter is smaller or indicated in a configuration parameter related to the DCI is used. The specific configuration parameter includes: a control resource set (CORESET), a PDCCH resource configuration (pdcch-config), a search space, a DMRS port group, a cell, a cell group, a transmission and reception point (TRP), an enabled transport block 1 (TB1), or an enabled transport block 2 (TB2). Similarly, the SLIV and/or the resource mapping tap follows the indication of the DCI with a smaller identifier or the indication of the configuration parameter related to the DCI.

(2) When the UE receives two pieces of DCI or configuration parameters related to two pieces of DCI, one or more of the "time domain resource assignment" field, the SLIV, or the resource mapping type follow an indication of primary DCI or an indication of a configuration parameter related to the primary DCI. The primary DCI or the configuration parameter related to the primary DCI includes more complete parameter types, or the primary DCI or the configuration parameter related to the primary DCI includes one or more specific parameters, for example, one or more of carrier indication information (carrier indicator), bandwidth part (BWP) indication information (BWP indicator), rate matching indication information (rate matching indicator), zero power channel state information reference signal (ZP CSI-RS) trigger information (ZP CSI-RS trigger), or a time domain resource assignment. Secondary DCI or a configuration parameter related to the secondary DCI includes fewer parameter types, or the DCI or the configuration parameter related to the DCI does not include one or more specific parameters, for example, one or more of a carrier indicator, a BWP indicator, a rate matching indicator, a ZP CSI-RS trigger, or a time domain resource assignment. Optionally, the secondary DCI may not have a time domain resource assignment, and a time domain resource assignment indicated by the primary DCI is followed during time domain resource assignment when data is scheduled based on the secondary DCI. Alternatively, the secondary DCI has a time domain resource assignment, but an indication of the primary DCI is followed during time domain resource assignment when data is scheduled based on the secondary DCI, or an SLIV and/or a resource mapping type when data is scheduled based on the secondary DCI follow/follows the indication of the primary DCI.

(3) When the UE receives two pieces of DCI or configuration parameters related to two pieces of DCI, one or more of the "time domain resource assignment" field, the SLIV, or the resource mapping type follow an indication of first-level DCI or an indication of a configuration parameter related to the first-level DCI. The first-level DCI is used to indicate whether second-level DCI exists or indicate a position of the second-level DCI.

(4) When the UE receives two pieces of DCI or configuration parameters related to two pieces of DCI, one or more of the "time domain resource assignment" field, the SLIV, or the resource mapping type follow an indication of slow DCI or an indication of a configuration parameter related to the slow DCI. The slow DCI appears at a relatively long interval and carries more complete parameter types, or the DCI includes one or more specific parameters, for example, one or more of a carrier indicator, a BWP indicator, a rate matching indicator, a ZP CSI-RS trigger, or a time domain resource assignment. Fast DCI appears at a relatively short interval and carries fewer parameter types and does not carry one or more specific parameters.

(5) When the UE receives two pieces of DCI or configuration parameters related to two pieces of DCI, one or more of the "time domain resource assignment" field, the SLIV, or the resource mapping type follow an indication of common DCI or an indication of a configuration parameter related to the common DCI. The common DCI (which may appear at a relatively long interval) carries one or more specific parameters, for example, one or more of a carrier indicator, a BWP indicator, a rate matching indicator, a ZP CSI-RS trigger, or a time domain resource assignment. Special DCI (which may appear at a relatively short interval) does not carry one or more specific parameters, and is mainly used for data scheduling.

(6) When the UE receives two pieces of DCI or configuration parameters related to two pieces of DCI, one or more of the "time domain resource assignment" field, the SLIV, or the resource mapping type follow an indication of DCI corresponding to a primary cell, a primary cell group, or a primary TRP or follow an indication of a configuration parameter related to the DCI. A value of a cell identifier corresponding to the primary cell is 0, a value of a cell group identifier corresponding to the primary cell group is 0, and a value of a transmission point identifier corresponding to the primary TRP is 0.

It can be learned that, optionally, the priorities are divided based on an ID of at least one of the following parameters that correspond to signaling for configuring the resource configuration information: a CORESET, a PDCCH-config/PUCCH-config, a search space, a DMRS port group, a cell, a cell group, or a TRP.

Optionally, the priorities are divided based on whether signaling for configuring the resource configuration information is primary or secondary signaling.

Optionally, the priorities are divided based on levels (for example, a first level and a second level) of signaling for configuring the resource configuration information.

Optionally, the priorities are divided based on whether signaling for configuring the resource configuration information is fast or slow signaling.

Optionally, the priorities are divided based on whether signaling for configuring the resource configuration information is common signaling or specific-type signaling.

Optionally, the priorities are divided based on cells, cell groups, or TRPs to which signaling for configuring the resource configuration information belongs.

In the resource configuration method according to this embodiment of this application, a receive end selects, based on the priority rule, resource configuration information that is of a DMRS resource and that is sent by a transmit end, thereby ensuring channel estimation performance of the receive end.

The foregoing mainly describes the solutions provided in the embodiments of this application from a perspective of interaction between entities in a system or an internal implementation procedure of an entity. It can be understood that, to implement the foregoing functions, each entity includes a corresponding hardware structure and/or software module for implementing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In an embodiment of this application, function modules of the UE and the network device may be divided according to the foregoing example method. For example, the function modules may be divided based on functions, or two or more functions may be integrated into one processing module. The integrated module may be implemented in a form of hardware, or may be implemented in a form of a software functional module. It should be noted that, in this embodiment of this application, module division is exemplary, and is merely a logical function division. In actual implementation, another division manner may be used. The following uses function module division based on functions as an example for description.

Figure 11:
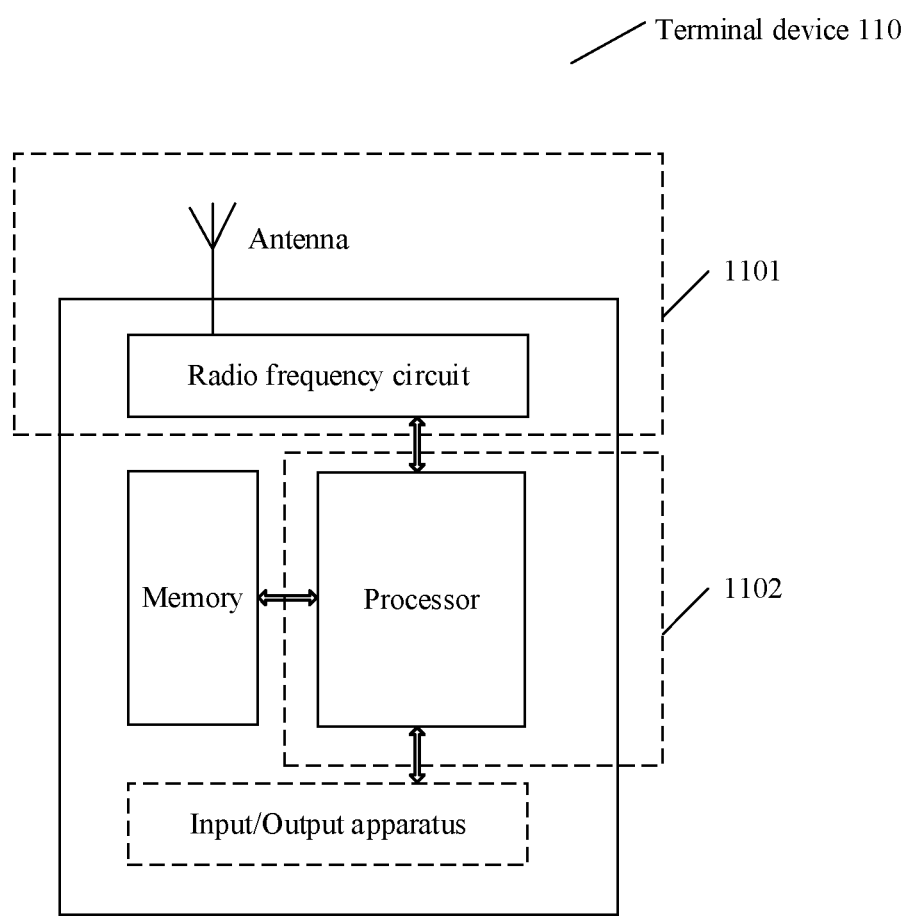
FIG. 11 is a simplified schematic structural diagram of a terminal device according to this application.

An embodiment of this application further provides a terminal device. The terminal device may be configured to perform the steps performed by the UE in any one of FIG. 2, FIG. 4, FIG. 5, or FIG. 10. FIG. 11 is a simplified schematic structural diagram of a terminal device. For case of understanding and illustration, in FIG. 11, for example, the terminal device is a mobile phone. As shown in FIG. 11, the terminal device 110 includes a processor, a memory, a radio frequency circuit, an antenna, and an input/output apparatus. The processor is mainly configured to process a communication protocol and communication data, control the terminal device 110, execute a software program, process data of the software program, and the like. The memory is mainly configured to store the software program and data. The radio frequency circuit is mainly configured to convert a baseband signal and a radio frequency signal and process the radio frequency signal. The antenna is mainly configured to send and receive a radio frequency signal in the form of an electromagnetic wave. The input/output apparatus, for example, a touchscreen, a display screen, or a keyboard, is mainly configured to receive data entered by a user and output data to the user. It should be noted that some types of terminal devices 110 may not have an input/output apparatus. The memory and the processor may be integrated together or may be disposed independently. In addition, the radio frequency circuit and the processor may be integrated together or may be disposed independently.

When data needs to be sent, the processor performs baseband processing on the to-be-sent data and outputs a baseband signal to the radio frequency circuit. The radio frequency circuit performs radio frequency processing on the baseband signal and sends a radio frequency signal to the external in the form of an electromagnetic wave through the antenna. When data is sent to the terminal device 110, the radio frequency circuit receives a radio frequency signal through the antenna, converts the radio frequency signal into a baseband signal, and outputs the baseband signal to the processor. The processor converts the baseband signal into data and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor or may be integrated together with the processor. This is not limited in this embodiment of this application.

In this embodiment of this application, the antenna and the radio frequency circuit that have a sending and receiving function may be considered as a transceiver unit of the terminal device 110, and the processor having a processing function may be considered as a processing unit of the terminal device 110. As shown in FIG. 11, the terminal device 110 includes a transceiver unit 1101 and a processing unit 1102. The transceiver unit may also be referred to as a transceiver (including a transmitter and/or a receiver), a transceiver apparatus, a transceiver circuit, or the like. The processing unit may also be referred to as a processor, a processing board, a processing module, a processing apparatus, or the like. Optionally, a component that is in the transceiver unit 1101 and that is configured to implement a receiving function may be considered as a receiving unit, and a component that is in the transceiver unit 1101 and that is configured to implement a sending function may be considered as a sending unit. In other words, the transceiver unit 1101 includes the receiving unit and the sending unit. The transceiver unit is also sometimes referred to as a transceiver, a transceiver circuit, or the like. The receiving unit is also sometimes referred to as a receiver, a receiving circuit, or the like. The sending unit is also sometimes referred to as a transmitter, a transmission circuit, or the like. In some embodiments, the transceiver unit 1101 and the processing unit 1102 may be integrated together or may be disposed independently. In addition, the functions of the processing unit 1102 may be integrated into one chip for implementation. Alternatively, some functions may be integrated into one chip for implementation, and other functions may be integrated into one or more other chips for implementation. This is not limited in this application. The term "unit" used in this specification may refer to an application-specific integrated circuit (ASIC), an electronic circuit, a (shared or dedicated) processor or a group of processor and a memory, and/or a combinatorial logic circuit that execute/executes one or more software or firmware programs, and/or other appropriate components that provide the described functions.

For example, in an implementation, the transceiver unit 1101 may be configured to perform the receiving operation of the UE in S102 in FIG. 2 and/or other steps in this application. The processing unit 1102 may be configured to perform S103 in FIG. 2 and/or other steps in this application.

For example, in an implementation, the transceiver unit 1101 may be configured to perform the receiving operation of the UE in S202 in FIG. 4 and/or other steps in this application. The processing unit 1102 may be configured to perform S203 in FIG. 4 and/or other steps in this application.

For example, in an implementation, the transceiver unit 1101 may be configured to perform the receiving operation of the UE in S302 in FIG. 5 and/or other steps in this application. The processing unit 1102 may be configured to perform S303 in FIG. 5 and/or other steps in this application.

For example, in an implementation, the transceiver unit 1101 may be configured to perform the receiving operation of the UE in S402 in FIG. 10 and/or other steps in this application. The processing unit 1102 may be configured to perform S403 in FIG. 10 and/or other steps in this application.

Figure 12:
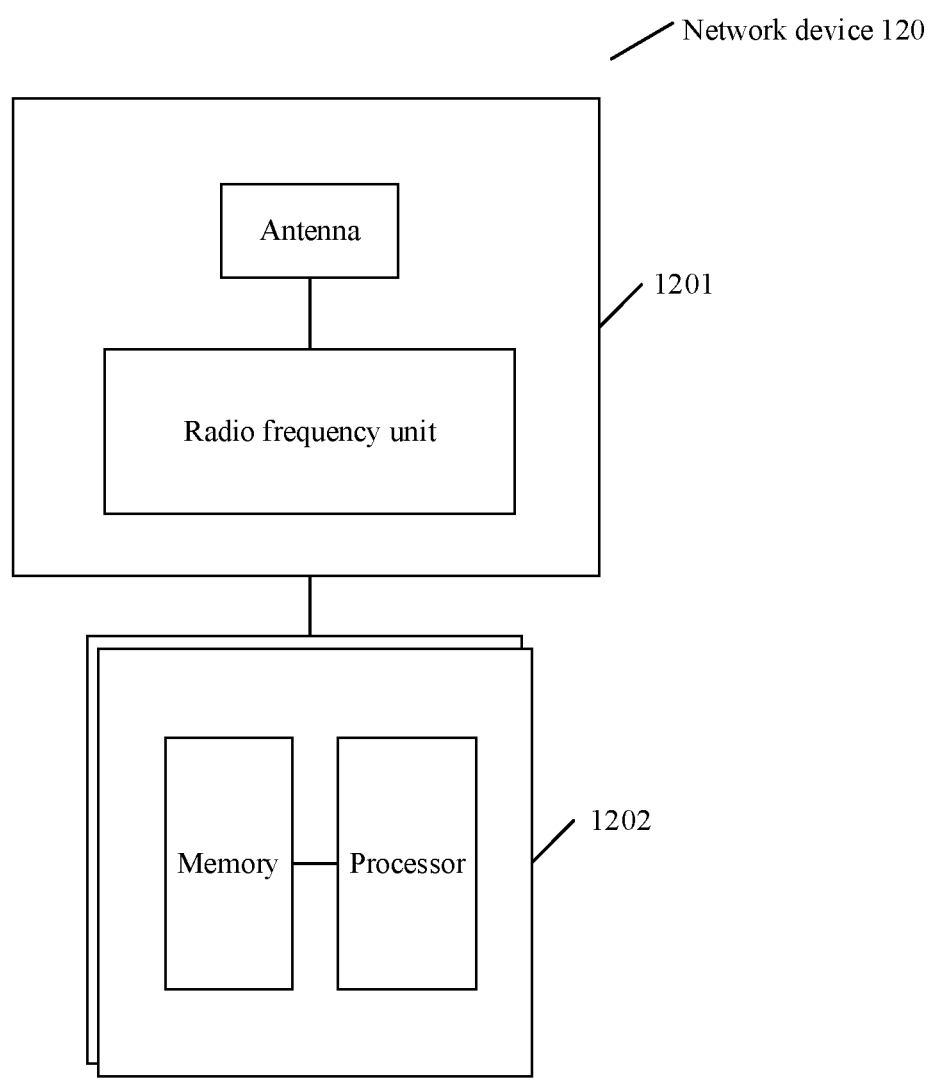
FIG. 12 is a simplified schematic structural diagram of a network device according to this application.

An embodiment of this application further provides a network device. The network device may serve as an access node or a transmission and reception point TRP, and is configured to perform the steps performed by the network device in any one of FIG. 2, FIG. 4, FIG. 5, or FIG. 10. FIG. 12 is a simplified schematic structural diagram of a network device. The network device 120 includes a portion 1201 and a portion 1202. The portion 1201 is mainly configured to send and receive a radio frequency signal and convert the radio frequency signal and a baseband signal. The portion 1202 is mainly configured to perform baseband processing, control the network device 120, and the like. The portion 1201 may usually be referred to as a transceiver unit, a transceiver, a transceiver circuit, or the like. The portion 1202 is usually a control center of the network device 120, and may usually be referred to as a processing unit, a control unit, a processor, a controller, or the like. The portion 1202 is configured to control the network device 120 to perform steps performed by an access-side measurement functional entity or performed by an access node/a transmission and reception point that serves as an access-side measurement functional entity in the foregoing related embodiments. For details, refer to the foregoing descriptions of related parts.

A transceiver unit of the portion 1201 may also be referred to as a transceiver or the like, and includes an antenna and a radio frequency unit. The radio frequency unit is mainly configured to perform radio frequency processing. Optionally, a component that is in the portion 1201 and that is configured to implement a receiving function may be considered as a receiving unit, and a component that is in the portion 1201 and that is configured to implement a sending function may be considered as a sending unit. In other words, the portion 1201 includes the receiving unit and the sending unit. The receiving unit may also be referred to as a receiver, a receiving circuit, or the like. The sending unit may also be referred to as a transmitter, a transmission circuit, or the like.

The portion 1202 may include one or more boards. Each board may include one or more processors and one or more memories. The processor is configured to read and execute a program in the memory to implement a baseband processing function and control the network device 120. If there are a plurality of boards, the boards may be interconnected to enhance a processing capability. In an optional implementation, alternatively, a plurality of boards may share one or more processors, a plurality of boards may share one or more memories, or a plurality of boards may share one or more processors at the same time. The memory and the processor may be integrated together or may be disposed independently. In some embodiments, the portion 1201 and the portion 1202 may be integrated together or may be disposed independently. In addition, the functions of the portion 1202 may be integrated into one chip for implementation. Alternatively, some functions may be integrated into one chip for implementation, and other functions may be integrated into one or more other chips for implementation. This is not limited in this application.

For example, in an implementation, the transceiver unit may be configured to perform the sending operation of the network device in S102 in FIG. 2 and/or other steps in this application. The processing unit may be configured to perform S101 in FIG. 2 and/or other steps in this application.

For example, in an implementation, the transceiver unit may be configured to perform the sending operation of the network device in S202 in FIG. 4 and/or other steps in this application. The processing unit may be configured to perform S201 in FIG. 4 and/or other steps in this application.

For example, in an implementation, the transceiver unit may be configured to perform the sending operation of the network device in S302 in FIG. 5 and/or other steps in this application. The processing unit may be configured to perform S301 in FIG. 5 and/or other steps in this application.

For example, in an implementation, the transceiver unit may be configured to perform the sending operation of the network device in S402 in FIG. 10 and/or other steps in this application. The processing unit may be configured to perform S401 in FIG. 10 and/or other steps in this application.

The terminal-side apparatus provided above may be a terminal device or may be a chip or a function module in a terminal device, and can implement the foregoing method by using software, hardware, or hardware executing corresponding software.

A specific implementation form of the network-side apparatus provided above may be an access node device or a transmission and reception point TRP, for example, may be an access node device or a TRP device or may be a chip or a function module in an access node device or a TRP device, and can implement the foregoing method by using software, hardware, or hardware executing corresponding software.

For interpretations of related content and beneficial effects of any terminal device, network device, and corresponding apparatus provided above, refer to the corresponding method embodiments provided above. Details are not described herein again.

This application further provides a beam failure detection system, including the UE (which may alternatively be a UE-side apparatus that implements a function of the foregoing UE) in the foregoing implementations and a network device.

This application further provides a computer program product. When the computer program product is run on a computer, the computer is enabled to perform any method provided above.

This application further provides a chip that stores an instruction. When the instruction is run on each device described above, the device is enabled to perform the method provided above.

This application further provides a computer storage medium that stores a computer program (instruction). When the program (instruction) is run on a computer, the computer is enabled to perform the method according to any one of the foregoing aspects.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD)), a semiconductor medium (for example, a solid-state drive (SSD))), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor/controller or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the appended claims, and modifications, variations, combinations or equivalents of the examples disclosed herein are within the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A resource configuration method, wherein the method comprises:
   receiving two or more groups of resource configuration information of a demodulation reference signal (DMRS), wherein the resource configuration information is information for configuring DMRS resources used to transmit the DMRS and the DMRS is used for demodulating a physical data channel; and
   determining, based on the two or more groups of resource configuration information, a DMRS resource configured by each group of resource configuration information,
   wherein the resource configuration information comprises at least one of the following: a quantity of front-loaded DMRSs, a position of a front-loaded DMRS, a position of an additional DMRS, a DMRS type, or a quantity of additional DMRSs;
   in the two or more groups of resource configuration information, a DMRS resource configured by a first group of resource configuration information does not intersect with a physical data channel resource corresponding to a second group of resource configuration information; and
   a physical data channel corresponding to the physical data channel resource is demodulated by using a DMRS transmitted on a second DMRS resource configured by the second group of resource configuration information;

wherein the second DMRS resource is selected for demodulating the physical data channel based on a priority rule and the priority rule is based on whether signaling for configuring the resource configuration information is primary or secondary signaling.

2. The method according to claim 1, wherein the resource configuration information further comprises a DMRS type and the DMRS type is type 1 or type 2.

3. The method according to claim 1, wherein the two or more groups of resource configuration information comprise parameter information shared between the groups, wherein the shared parameter information is sent by using higher layer signaling.

4. A processing apparatus, comprising at least one processor, wherein the at least one processor is configured to read an instruction in a memory, and implement:

receiving two or more groups of resource configuration information of a demodulation reference signal (DMRS), wherein the resource configuration information is information for configuring DMRS resources used to transmit the DMRS and the DMRS is used for demodulating a physical data channel; and determining, based on the resource configuration information, a DMRS resource configured by each group of resource configuration information, wherein the resource configuration information comprises at least one of the following: a quantity of front-loaded DMRSs, a position of a front-loaded DMRS, a position of an additional DMRS, a DMRS type, or a quantity of additional DMRSs;

in the two or more groups of resource configuration information, a DMRS resource configured by a first group of resource configuration information does not intersect with a physical data channel resource corresponding to a second group of resource configuration information; and a physical data channel corresponding to the physical data channel resource is demodulated by using a DMRS transmitted on a second DMRS resource configured by the second group of resource configuration information;

wherein the second DMRS resource is selected for demodulating the physical data channel based on a priority rule and the priority rule is based on whether signaling for configuring the resource configuration information is primary or secondary signaling.

5. The processing apparatus according to claim 4, wherein the resource configuration information further comprises a DMRS type and the DMRS type is type 1 or type 2.

6. The processing apparatus according to claim 4, wherein the two or more groups of resource configuration information comprise parameter information shared between the groups, wherein the shared parameter information is sent by using higher layer signaling.

7. The processing apparatus according to claim 4, wherein the processing apparatus is a chip or a terminal device.

8. A non-transitory computer-readable storage medium storing a computer program which when executed causes the following operations to be performed:

receiving two or more groups of resource configuration information of a demodulation reference signal (DMRS), wherein the resource configuration information is information for configuring DMRS resources used to transmit the DMRS and the DMRS is used for demodulating a physical data channel; and determining, based on the two or more groups of resource configuration information, a DMRS resource configured by each group of resource configuration information, wherein the resource configuration information comprises at least one of the following: a quantity of front-loaded DMRSs, a position of a front-loaded DMRS, a position of an additional DMRS, a DMRS type, or a quantity of additional DMRSs;

in the two or more groups of resource configuration information, a DMRS resource configured by a first group of resource configuration information does not intersect with a physical data channel resource corresponding to a second group of resource configuration information; and a physical data channel corresponding to the physical data channel resource is demodulated by using a DMRS transmitted on a second DMRS resource configured by the second group of resource configuration information;

wherein the second DMRS resource is selected for demodulating the physical data channel based on a priority rule and the priority rule is based on whether signaling for configuring the resource configuration information is primary or secondary signaling.

9. The non-transitory computer-readable storage medium according to claim 8, wherein the resource configuration information further comprises a DMRS type and the DMRS type is type 1 or type 2.

10. The non-transitory computer-readable storage medium according to claim 8, wherein the two or more groups of resource configuration information comprise parameter information shared between the groups, wherein the shared parameter information is sent by using higher layer signaling.

11. The non-transitory computer-readable storage medium according to claim 8, wherein the non-transitory computer-readable storage medium is on a chip or a terminal device.

12. The non-transitory computer-readable storage medium according to claim 8, wherein that a DMRS resource configured by the first group of resource configuration information does not intersect with the physical data channel resource corresponding to the second group of resource configuration information comprises:

the DMRS resource configured by the first group of resource configuration information is identical with the DMRS resource configured by the second group of resource configuration information in time domain.

13. The method according to claim 1, wherein that the DMRS resource configured by the first group of resource configuration information does not intersect with the physical data channel resource corresponding to the second group of resource configuration information further comprises:

the DMRS resource configured by the first group of resource configuration information is identical with the DMRS resource configured by the second group of resource configuration information in time domain.

14. The method according to claim 1, wherein the priority rule is further based on whether signaling for configuring the resource configuration information is fast or slow signaling.

15. The method according to claim 1, wherein the priority rule is further based on whether a cell or a cell group corresponding to the resource configuration information is primary or secondary.

16. The method according to claim 1, wherein a mapping type of a first physical data channel associated with a front-loaded DMRS comprises a type A and a type B, and when the mapping type is the type B the position of the front-loaded DMRS is associated with a resource position of the first physical data channel.

17. The method according to claim 1, wherein a mapping type of a first physical data channel associated with a front-loaded DMRS comprises a type A and a type B, and when the mapping type is the type A the position of the first front-loaded DMRS is located at a fixed symbol position.

18. The method according to claim 17, wherein the fixed symbol position is a symbol 2 or a symbol 3, where the symbols are numbered starting from 0.

19. The processing apparatus according to claim 4, wherein the priority rule is further based on whether a cell or a cell group corresponding to the resource configuration information is primary or secondary.

\* \* \* \* \*